(12) United States Patent
Zhu

(10) Patent No.: US 10,738,802 B2
(45) Date of Patent: Aug. 11, 2020

(54) HYDRAULIC BUFFER AND CYLINDER COMBINED WITH THE SAME

(71) Applicant: QINGDAO ACME INNOVATION TECHNOLOGY CO., LTD., Shibei District, Qingdao, Shandong (CN)

(72) Inventor: Dewei Zhu, Shandong (CN)

(73) Assignee: QINGDAO ACME INNOVATION TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/307,181

(22) PCT Filed: Jun. 15, 2017

(86) PCT No.: PCT/CN2017/088436
§ 371 (c)(1),
(2) Date: Dec. 5, 2018

(87) PCT Pub. No.: WO2017/215631
PCT Pub. Date: Dec. 21, 2017

(65) Prior Publication Data
US 2019/0186509 A1 Jun. 20, 2019

(30) Foreign Application Priority Data
Jun. 16, 2016 (CN) .......................... 2016 1 0419750

(51) Int. Cl.
*F15B 15/22* (2006.01)
*F15B 13/02* (2006.01)

(52) U.S. Cl.
CPC ............ *F15B 15/223* (2013.01); *F15B 13/02* (2013.01); *F15B 13/025* (2013.01); *F15B 15/22* (2013.01); *F15B 2211/755* (2013.01)

(58) Field of Classification Search
CPC . F15B 15/223; F15B 13/021; F15B 2211/755
See application file for complete search history.

(56) References Cited

U.S. PATENT DOCUMENTS 3,998,132 A * 12/1976 Rasigade .............. F15B 15/225
91/395
4,425,835 A * 1/1984 Krasnoff .............. F01L 25/063
91/285
(Continued)

FOREIGN PATENT DOCUMENTS

CN 1439823 A 9/2003
CN 201358976 Y 12/2009
(Continued)

*Primary Examiner* — F Daniel Lopez
(74) *Attorney, Agent, or Firm* — Bayramoglu Law Offices LLC

(57) ABSTRACT

A hydraulic buffer pertains to the field of hydraulic parts. A signal device (X) is installed at a position close to an end of a cylinder stroke to control movement of slide valves (12, 18, 12a, 12b, 12c, 12d, 12e, 12f, F1, F2, F3, F4) of the hydraulic buffer, to dynamically adjust the degree of valve openness and a liquid flow direction of a buffering module (Y), and therefore control pressure of oil entering an oil returning chamber of a cylinder. The high-pressure chamber of the cylinder releases pressure and unloads, and/or the oil returning chamber throttles to load pressure, such that a moving speed of a cylinder piston (6) at the end of the stroke is controlled, realizing buffering of the cylinder. The device eliminates defects in the prior art in which a buffering mechanism of a cylinder is complex, manufacturing accuracy requirements are high, structural arrangement is difficult, it is difficult to employ a combined configuration in which an oil returning chamber throttles to load pressure and a high-pressure chamber releases pressure and unloads, and buffering efficiency is not high. The device has desirable buffering controllability and high reliability, such that the overall quality is improved.

10 Claims, 27 Drawing Sheets

(56) References Cited

U.S. PATENT DOCUMENTS

| | | | |
|---|---|---|---|
| 7,528,332 | B1 | 5/2009 | Via et al. |
| 9,322,270 | B2 | 4/2016 | Baumgartner |

FOREIGN PATENT DOCUMENTS

| | | |
|---|---|---|
| CN | 201593537 U | 9/2010 |
| CN | 201636116 U | 11/2010 |
| CN | 201636117 U | 11/2010 |
| CN | 201636118 U | 11/2010 |
| CN | 102094867 A | 6/2011 |
| CN | 102434523 A | 5/2012 |
| CN | 202560686 U | 11/2012 |
| CN | 203146475 U | 8/2013 |
| CN | 103438050 A | 12/2013 |
| CN | 203321937 U | 12/2013 |
| CN | 203335528 U | 12/2013 |
| CN | 203376549 U | 1/2014 |
| CN | 203500175 U | 3/2014 |
| CN | 203500176 U | 3/2014 |
| CN | 203548411 U | 4/2014 |
| CN | 203614510 U | 5/2014 |
| CN | 203627378 U | 6/2014 |
| CN | 104074837 A | 10/2014 |
| CN | 203926221 U | 11/2014 |
| CN | 104389850 A | 3/2015 |
| CN | 204239375 U | 4/2015 |
| CN | 104595281 A | 5/2015 |
| CN | 104747535 A | 7/2015 |
| CN | 204434219 U | 7/2015 |
| CN | 204739033 U | 11/2015 |
| CN | 105889173 A | 8/2016 |
| CN | 205744685 U | 11/2016 |
| DE | 19905855 A1 | 8/2000 |
| DE | 202013010972 U1 | 3/2015 |
| JP | S5316183 A | 2/1978 |
| JP | S58152908 A | 9/1983 |
| JP | H0478310 A | 7/1992 |
| JP | 2002227906 A | 8/2002 |

\* cited by examiner

HYDRAULIC BUFFER AND CYLINDER COMBINED WITH THE SAME

BACKGROUND OF THE INVENTION

1. Field of the Invention

The present invention relates to a hydraulic assembly and, more particularly, to a hydraulic buffer and a cylinder connected with the hydraulic buffer of an engineering apparatus.

2. Description of Related Art

For cycling operations of engineering apparatuses such as a digging operation of an excavator or a shoveling operation of a bulldozer, a conventional cylinder is a key system to the engineering apparatuses. The conventional cylinder may utilize a piston rod to process a dynamic operation, and may be applied with a conventional buffer to provide a buffering effect to the engineering apparatus.

However, the conventional cylinder connected with the conventional buffer has the following shortcomings.

1. The method of the conventional buffer to provide a buffering effect is monotonous, and a structural arrangement is complicated.

2. Difficulties in combining two kinds of buffering methods, i.e., throttling backpressure of a return chamber and pressure-relief unloading of a pressure chamber, cause low buffering efficiency.

3. A buffering process due to throttling backpressure is unable to self-adjust against a moving velocity of the piston rod since a throttling opening of the conventional cylinder is fixed. Therefore, the buffering effect is poor in controllability and quality.

4. Low reliability. Manufacturing precision is highly required for a conventional cylinder. The buffering effect may fail due to a small defect or eccentricity on part of the assemblies of the conventional cylinder and the connected buffer.

SUMMARY OF THE INVENTION

The main objective of the present invention is to provide a hydraulic buffer and a cylinder combined with the hydraulic buffer. The present invention is good at buffering, safe, and reliable, so the shortcomings of the conventional cylinder and the conventional buffer may be overcome.

A hydraulic buffer is connected with a cylinder that is controlled and buffered by the hydraulic buffer. The hydraulic buffer comprises at least one signal generator and a buffering module. The at least one signal generator is disposed in a chamber of the cylinder and has a signal chamber and a signal plug. The signal chamber is disposed on a top end or a bottom end of the cylinder. The signal plug is able to slide relative to the signal chamber and protrudes on a side of a piston assembly of the cylinder. The buffering module is integrally formed on or assembled to the cylinder, and has a valve body, at least one slide valve, and at least one elastic component. The at least one slide valve is each respectively connected to the at least one signal generator, is controlled by the at least one signal generator to adjust the hydraulic flows passing into and out of the cylinder, and has a damping hole disposed therethrough. The at least one elastic component is mounted in the valve body and abuts the valve body and the at least one slide valve. The signal plug moving with the piston assembly selectively enters and slides in the signal chamber.

Because the signal chamber is then independent from the chamber of the cylinder, oil may be thereby sent from the signal chamber with part of the oil flowing through the damping hole and the rest of the oil that is sent from the signal chamber pushing the at least one slide valve to move against the at least one elastic component. By this process, the hydraulic flows passing into and out of the cylinder may be adjusted and buffered by at least one of the methods of pressure-relief unloading of a pressure chamber and throttling backpressure of a return chamber.

Besides, the hydraulic buffer further has at least one check valve. The at least one check valve is connected between an opening of the valve body and the signal chamber so that hydraulic flows may unidirectionally flow from the opening.

A cylinder with the hydraulic buffer as mentioned above is also provided. The cylinder has a cylinder body and a piston assembly. The cylinder body has a top end and a bottom end. The piston assembly slidably moves in the cylinder body and has a piston rod and a piston. The piston is mounted with the piston rod and divides a space inside the cylinder body into a first half of the chamber and a second half of the chamber. The buffering module of the hydraulic buffer is integrally formed on or assembled to the cylinder, the at least one signal generator is disposed in the first half of the chamber or the second half of the chamber, and the at least one signal generator is able to control movement of the at least one slide valve of the buffering module to buffer the piston by pressure-relief unloading of a pressure chamber and throttling backpressure of a return chamber.

Moreover, the buffering module has two slide valves, and the two slide valves are each integrally formed on or assembled to the bottom end and the top end of the cylinder.

In addition, the signal plug is formed as a single piece on the piston assembly, or is manufactured from a wear-resistant or elastic material, and is mounted to the piston assembly.

With respect to the conventional hydraulic system, the present invention has the following advantages:

1. A buffering resistance and a velocity of the piston are mutually responsive, so the buffering effect is controllable and self-adjustable, so that the buffering effect has a high quality and stability.

2. The signal generator makes the buffering module have a simplified structure. Also, components of the buffering module are unlikely to affect the buffering effect due to defects or eccentricities. Therefore, the buffering module may have a longer lifetime and a higher reliability.

3. The quality of the buffering effect improves so that strokes will not harm the cylinder anymore. The cylinder also may have a longer lifetime.

DETAILED DESCRIPTION OF THE PREFERRED EMBODIMENTS

Detailed descriptions of embodiments of the present invention are supported with the drawings and shown as follows.

First Embodiment

Figure 1:
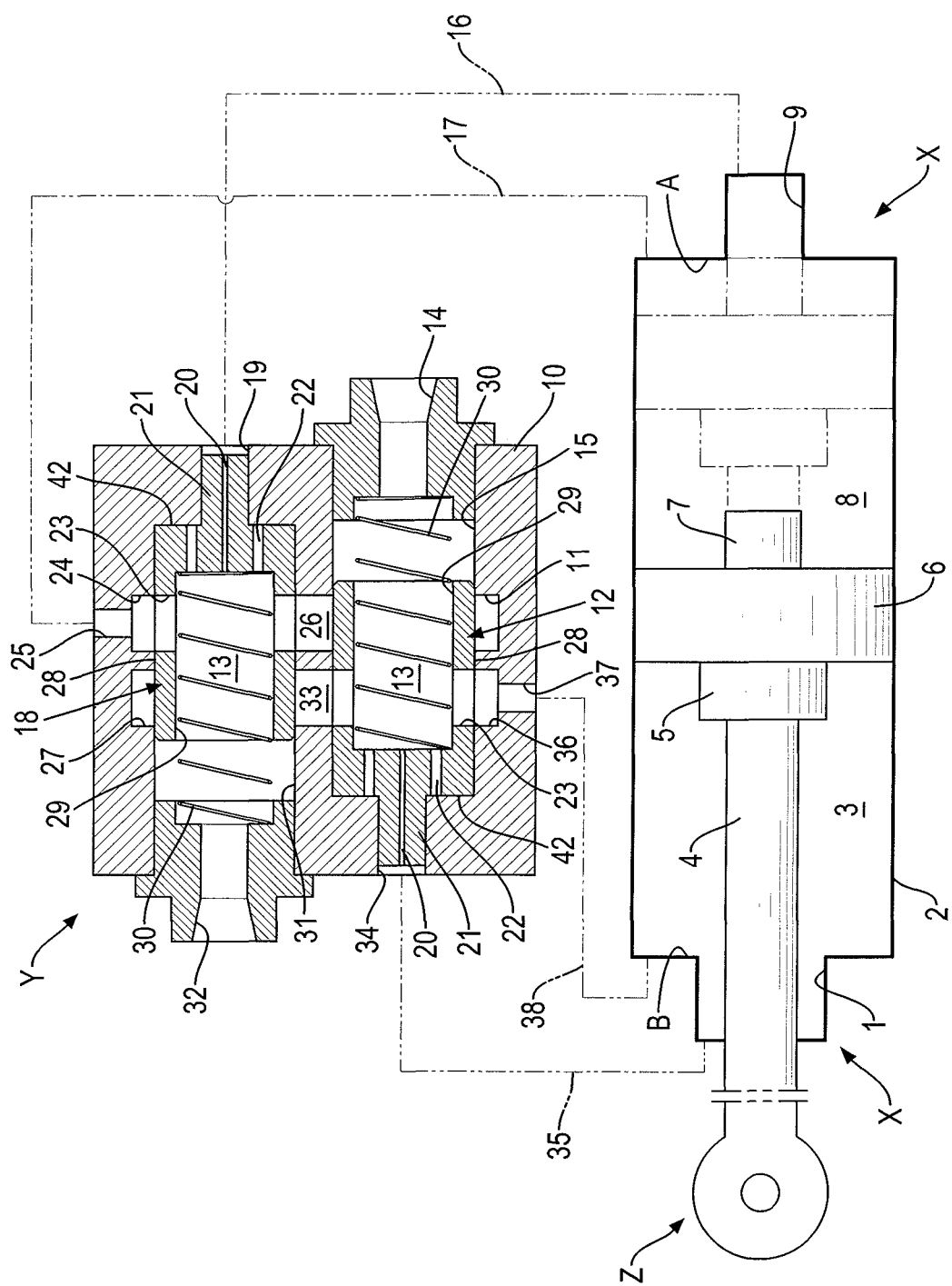
FIG. 1 is a side view in partial section of a first embodiment of a hydraulic buffer and a cylinder combined with the hydraulic buffer in accordance with the present invention.
Figure 2A:
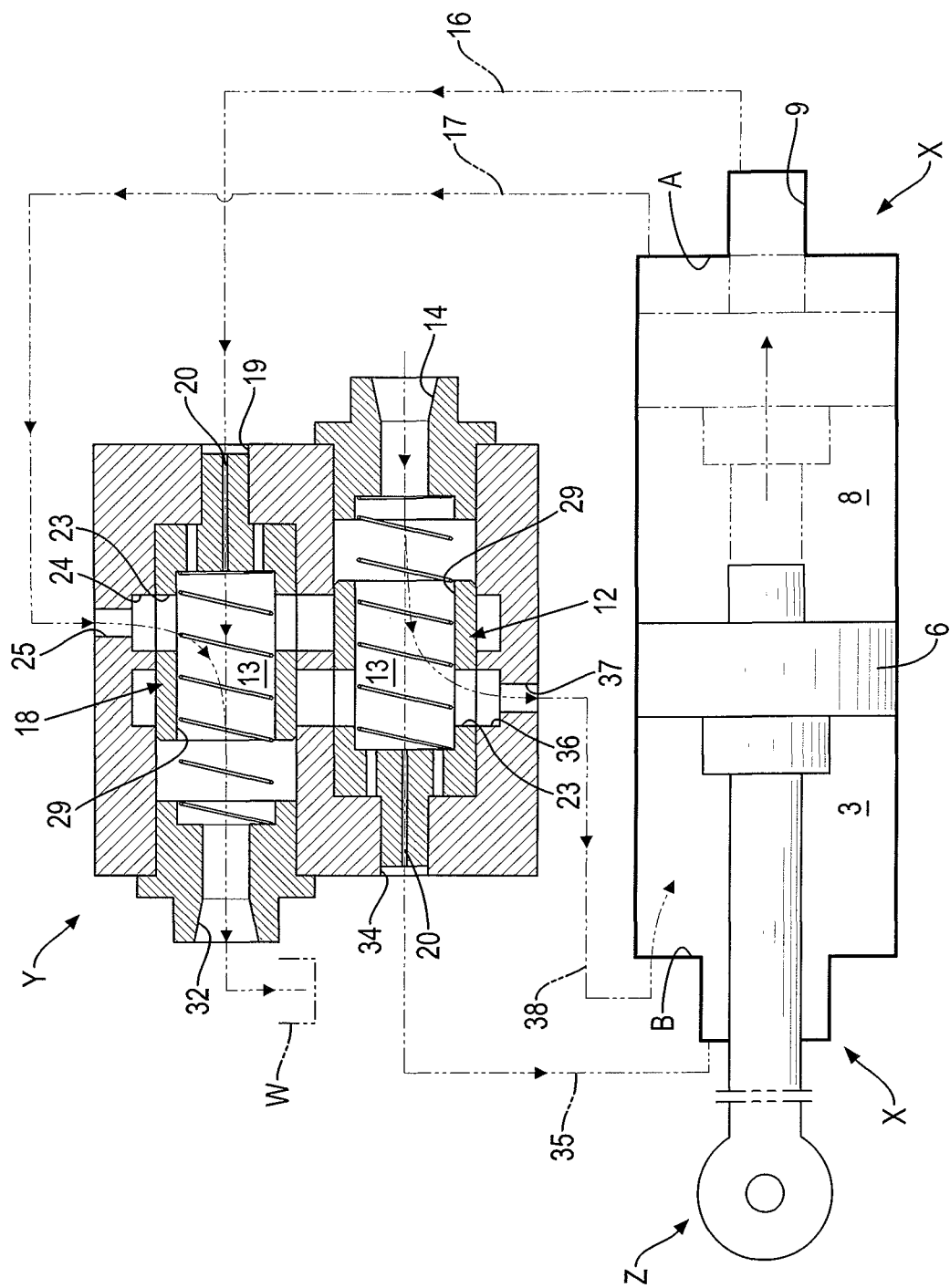
FIG. 2A is a side view in partial section of a beginning status of the hydraulic system in FIG. 1.
Figure 2B:
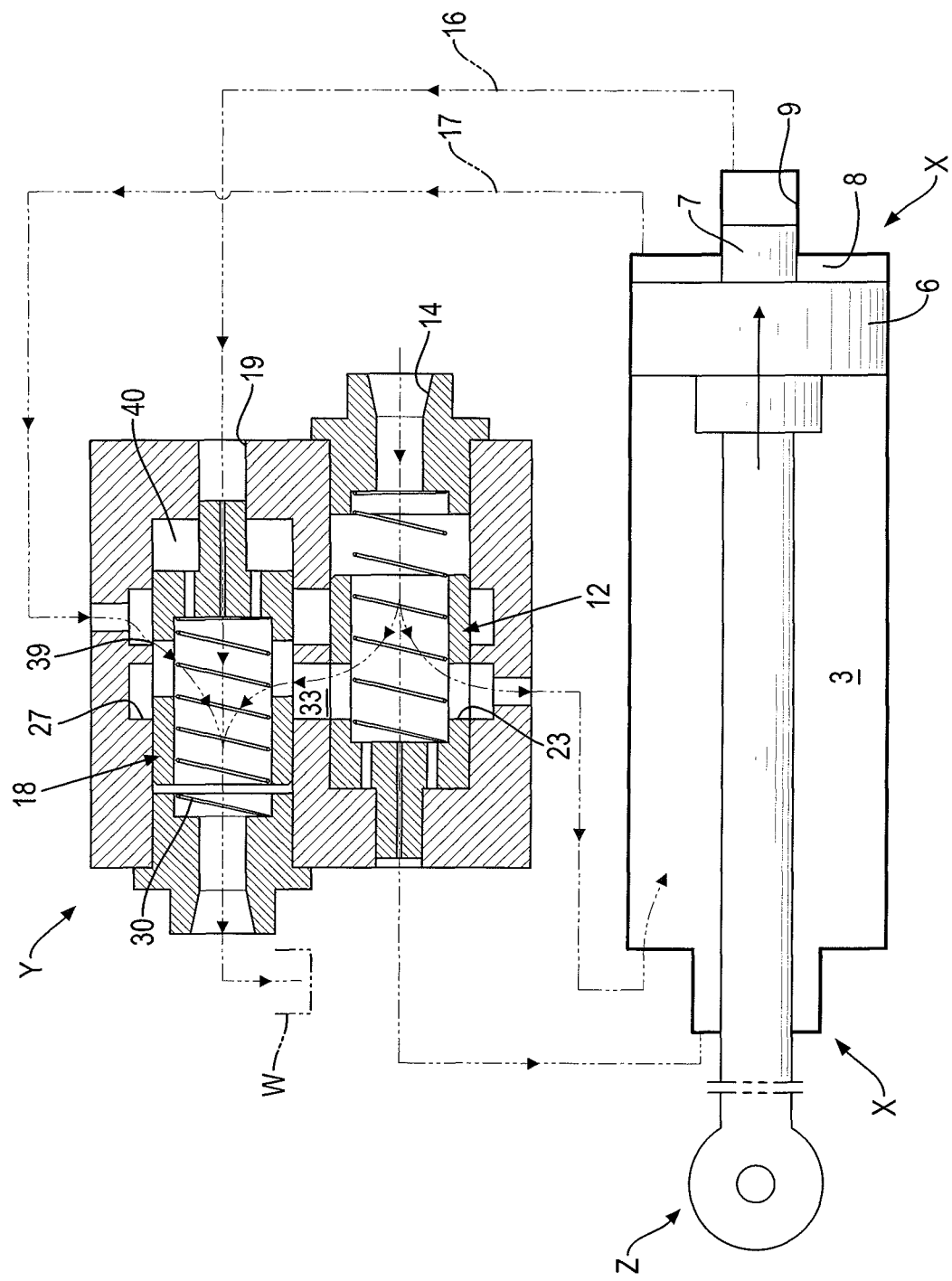
FIG. 2B is a side view in partial section of a processing status of the hydraulic system in FIG. 1.
Figure 3:
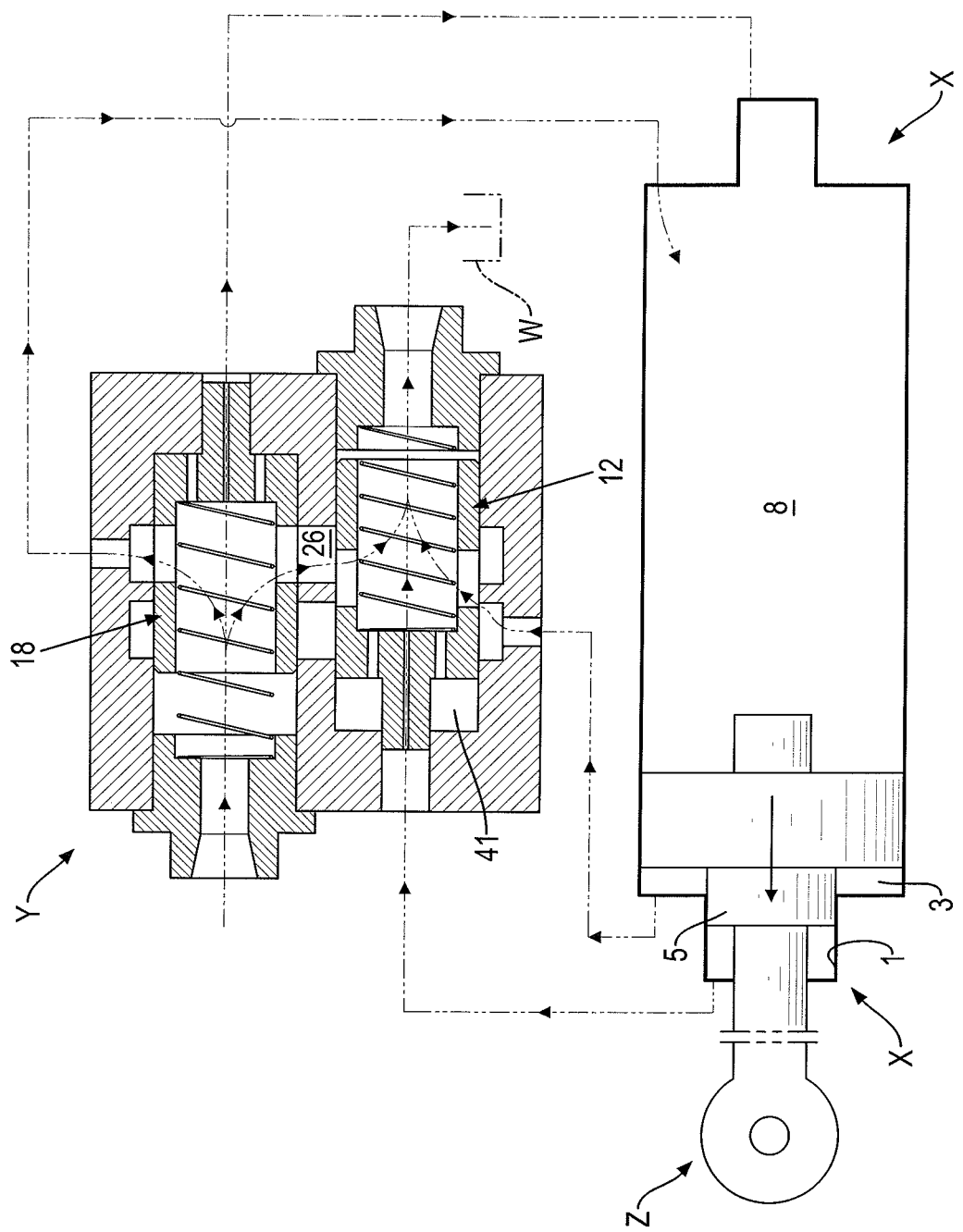
FIG. 3 shows a movement in an opposite direction of the hydraulic system in FIG. 1.

With reference to FIGS. 1 to 3, a hydraulic buffer and a cylinder combined with the hydraulic buffer in accordance with the present invention comprise two signal generators X, a buffering module Y, and the cylinder Z. The three components are connected by oil lines. Adopting two methods of buffering, i.e., pressure-relief unloading of a pressure chamber and throttling backpressure of a return chamber, a velocity of a piston of the hydraulic system may be adjusted at the end of a process. Bidirectional buffering effect may be accomplished as well. In the drawings, flow directions are indicated by arrows. The cylinder Z has a cylinder body 2, a piston rod 4, a piston 6, a top end B, and a bottom end A. The piston 6 and the piston rod 4 are connected as a piston assembly sliding in the cylinder body 2, and the piston 6 divides the space inside the cylinder body 2 into a first half 3 of the chamber and a second half 8 of the chamber. The buffering module Y has a valve body 10, two slide valves 12, 18, and two elastic components 30.

The valve body 10 comprises two sets of major and minor holes, including a first major hole 15, a second major hole 31, a first minor hole 34, and a second minor hole 19. The first major hole 15 has a first major oil groove 36 and a first minor oil groove 11, which are radially disposed in the first major hole 15 and spaced from each other in an axial direction. The second major hole 31 has a second major oil groove 24 and a second minor oil groove 27, which are radially disposed in the second major hole 31 and spaced from each other in an axial direction. Moreover, the first minor oil groove 11 communicates with the second major oil groove 24 through a first channel 26, and the first major oil groove 36 communicates with the second minor oil groove 27 through a second channel 33.

Besides, the valve body 10 further comprises a first outer opening 14, a second outer opening 32, a first side opening 37, and a second side opening 25. The first outer opening 14 and the second outer opening 32 coaxially communicate with the first major hole 15 and the second major hole 31, and are connected with oil lines of the hydraulic system, respectively. The first side opening 37 and the second side opening 25 communicate with the first major hole 15 and the second major hole 31, and are connected to first half 3 of the chamber and a second half 8 of the chamber of the cylinder Z via oil lines, respectively. The two signal chambers 1, 9 of the two signal generators X are respectively connected to the first side opening 34 and the second side opening 19 to control the corresponding slide valves 12, 18. The two slide valves 12, 18 are a first slide valve 12 and a second slide valve 18, and are slidably mounted in the first major hole 15 and the second major hole 31, respectively.

Each one of the two slide valves 12, 18 has a valve surface 28, a cavity 29, an auxiliary surface 21, a damping hole 20, a main oil hole 23, multiple supplementary oil holes 22, and a shoulder portion 42. The valve surface 28 and the auxiliary surface 21 are located on two different ends of the slide valves 12, 18. The damping hole 20 is disposed through a center of the slide valves 12, 18, and communicates with the cavity 29 and a main oil chamber 13 of the slide valves 12, 18. The cavity 29 is disposed through the valve surface 28 to the main oil hole 23 that is radially disposed through the slide valves 12, 18. The valve surface 28 is fit in the two major holes 15, 31. The auxiliary surface 21 is fit in the two minor holes 19, 34. An outer diameter of the auxiliary surface 21 is smaller than an outer diameter of the valve surface 28.

The shoulder portion 42 is located between a part with the outer diameter of the auxiliary surface 21 and a part with the outer diameter of the valve surface 28. The supplementary holes 22 are axially disposed through the shoulder portion 42, and communicate with the cavity 29 and a respective auxiliary oil chamber 40, 41. The two elastic components 30 are mounted in the cavity 29 of the slide valves 12, 18 and the two outer openings 14, 32, and the corresponding shoulder portions 42 thereby abut the two major holes 15, 31. The two signal generators X are respectively disposed in first half 3 of the chamber and a second half 8 of the chamber, and are connected to the respective slide valves through oil lines 16, 35. The two signal generators X are composed of two signal chambers 1, 9 and two signal plugs 5, 7, wherein the two signal chambers 1, 9 are respectively disposed on the top end B and the bottom end A of the cylinder Z.

The two signal plugs 5, 7 protrude on the two sides of the piston 6, and slidably align with the signal chambers 1, 9. With reference to FIGS. 1 and 2A, the valve surface 28 of the slide valves 12, 18 fits with the corresponding major holes 15, 31, and the main oil hole 23 aligns with the corresponding major oil grooves 24, 36. Openings communicating between the radial main oil hole 23 and the major oil groove 24, 36 are maximized. In addition, at the same time, the minor oil grooves 11, 27 are covered and blocked by the valve surfaces 28, so the minor oil grooves 11, 27 are blocked from communicating with the cavities 29 of the slide valves 12, 18. As the slide valves 12, 18 move toward the other end, the main oil holes 23 will gradually depart from the major oil grooves 24, 36 to the minor oil grooves 11, 27.

After the movement, the minor oil grooves 11, 27 will communicate with the main oil holes 23, the major oil grooves 24, 36 will be blocked by the valve surface 28, and communication between them is thereby blocked. The two slide valves 12, 18 may slide axially according to control signals from the corresponding signal generators X to adjust the amount and flowing direction of oil. Consequently, the methods of throttling backpressure of a return chamber and pressure-relief unloading of a pressure chamber may be utilized at the same time and provide a buffering effect.

Detailed description of how the buffering works is as follows.

The hydraulic system comprises the signal generators X and the buffering module Y. The two signal generators X are mounted in the first half 3 of the chamber and a second half 8 of the chamber of the cylinder Z. The first signal chamber 1 and the second signal chamber 9 of the two signal generators X are respectively disposed on the top end B and the bottom end A, and slidably align with the first signal plug 5 and the second signal plug 7 that protrude on the two sides of the piston 6, respectively. Compressed oil coming from the relative movements will serve as a control signal, and make the slide valves 12, 18 of the buffering module Y able to slide under control. In this way, the buffering effect on the piston 6 of the cylinder Z is adjustable.

When the piston 6 keeps still or moves before the first signal plug 5 enters the first signal chamber 1 (or before the second signal plug 7 enters the second signal chamber 9), with reference to FIGS. 1 and 2A, the shoulder portions 42 of the first slide valve 12 and the second slide valve 18 are pushed by the two elastic components 30 and thus abut the major holes 15, 31. Synchronically, the main oil holes 23 of the first slide valve 12 and the second slide valve 18 align with the first major oil groove 36 and the second major oil groove 24, respectively. Multiple valve openings 39 between the main oil holes 23 and the two major oil grooves 36, 24 are maximized consequently. That is to say, the main oil holes 23 of the first and second slide valves 12, 18 remain in full communication with the major oil grooves 36, 24. No control signal is sent from the signal generators X then, so the buffering module Y cannot be actuated and provide a buffering effect.

With reference to FIG. 2A, the piston 6 is moved from first half 3 of the chamber and a second half 8 of the chamber, and the second signal plug 7 has not entered the second signal chamber 9. Compressed oil flows into the first half 3 of the chamber through the first outer opening 14, the main oil chamber 13 of the first major hole 15, the cavity 29 and the main oil hole 23 of the first slide valve 12, the first major oil groove 36, the first side opening 37, and a first cylinder oil line 38. (A little of the compressed oil flows into the first half 3 of the chamber through the damping hole 20 of the first slide valve 12 and a first oil line 35.) The compressed oil flowing into the first half 3 of the chamber pushes the piston 6 toward the second half 8 of the chamber. Furthermore, oil in the second half 8 of the chamber starts to be compressed by the piston 6 and flows to an oil tank W via a second cylinder oil line 17, the second side opening 25, the second major oil groove 24, the main oil hole 23 and the cavity 29 of the second slide valve 18, and the main oil chamber 13 and the second outer opening 32. (A little of the compressed oil flows to the oil tank W via a second oil line 16 and the damping hole 20 of the second slide valve 18.)

Because the first and the second minor oil grooves 11, 27 are respectively blocked by the valve surfaces 28 of the first and the second slide valves 12, 18, the first minor oil groove 11 is unable to communicate with the cavity 29 of the first slide valve 12, and the second minor oil groove 27 is unable to communicate with the cavity 29 of the second slide valve 18. Therefore, the oil flows independently in the two major holes 15, 31, respectively pressure oil and return oil for the cylinder Z, and collaboratively drives the piston 6 of the cylinder Z to work as a conventional cylinder. For the time being, the first half 3 of the chamber is a pressure chamber, and the second half 8 of the chamber is a return chamber.

When the piston 6 keeps moving to a position shown by imaginary lines in FIG. 2A and the second signal plug 7 enters the second signal chamber 9, the second signal plug 7 isolates the second signal chamber 9 from the second half 8 of the chamber. Assume that V0 is a velocity of the piston 6, and P3, P8, and P9 are respectively values of hydraulic pressure of the first half 3 of the chamber, the second half 8 of the chamber, and the second signal chamber 9. A value of hydraulic pressure of the second minor hole 19 is also P9. At present, P3 shall be the working pressure of the cylinder Z. P8 and P9 are the oil-returning pressure of the oil tank W, being zero under assumption of no pressure loss. With reference to FIG. 2B, as the piston 6 keeps moving, a volume of the second signal chamber 9 begins to reduce, so P9 becomes larger and drives the oil to flow to the second minor hole 19 of the buffering module Y as a control signal. Other than a little portion of the oil flowing through the damping hole 20 of the second slide valve 18 to the oil tank W, the rest of the oil will force the second slide valve 18 to slide in the second major hole 31 against restoring effect of the elastic component 30.

The valve opening 39 between the main oil hole 23 of the second slide valve 18 and the second major oil groove 24 narrows and causes throttling, so a resistance against returning oil promotes P8 to rise and may slow down the piston 6. On the other hand, the main oil hole 23 of the second slide valve 18 gradually communicates with the second minor oil groove 27, so the compressed oil may flow to the oil tank W via the main oil hole 23 of the first slide valve 12, the first major oil groove 36, the second channel 33, the second minor oil groove 27, the main oil hole 23 and the cavity 29 of the second slide valve 18. Therefore, the hydraulic system may start to unload, P3 in the first half 3 of the chamber decreases, so V0 of the piston 6 decreases due to collaboration of loss of a pushing force and a gain of resisting force.

Next, the second signal plug 7 slows down in the second signal chamber 9 as V0 decreases, so P9 will become smaller, so that the pressing force against the second slide valve 18 will decrease. The second slide valve 18 will slide accordingly to a variation of P9 and the restoring force of the elastic component 30. The buffering effect of the hydraulic system may be thereby raised in quality, since V0 and the valve openings 39 have a negative correlation. A larger V0 of the piston 6 drives more oil to the second minor hole 19 from the signal generator X on the bottom end A of the cylinder Z, and leads to a larger displacement of the second slide valve 18 and a smaller valve opening 39. The smaller valve opening 39 leads to a larger throttling resistance, and thus P8 will increase and slow down the piston 6. Throughout the buffering process, V0 is at a maximum at the beginning, and the valve opening 39 tends to shrink the fastest to acquire the largest oil-returning resistance.

As V0 gradually decreases, the valve opening 39 will expand to lower the resistance. When V0 has decreased to a critical value V1, the oil as the control signal from the second signal chamber 9 may be completely exhausted through the damping hole 20, and no more oil may push the second slide valve 18. Then, the second slide valve 18 will reach a stable equilibrium by collaborations of P3, P8, P9, and the restoring force of the elastic component 30, and the piston 6 may stably finish a stroke with a velocity of V1. After the piston 6 reaches the bottom end A of the cylinder Z, the second slide valve 18 will be pushed back to an original position by the elastic component 30. Oil may fill a second auxiliary oil chamber 40 through the supplementary holes 22 of the second slide valve 18, when the second slide valve 18 moves.

The critical value V1 of the velocity of the piston 6 may represent the quality of the buffering effect. A smaller V1 means a smaller colliding force when a stroke is finished, i.e., a better quality of the buffering effect. Moreover, the critical value V1 is influenced by factors including coefficients of elasticity of the elastic components 30, pre-loaded pressure to the elastic components 30, diameters of the damping holes 20, surface areas of the signal chambers 1, 9, and surface areas of the minor holes 34, 19. A manufacturer may set up a critical value V1 by adjusting these factors. Theoretically, the critical value V1 may be adjusted to nearly zero.

Sensitivity of the buffering may be raised by increasing a ratio of the surface areas between the signal chambers 1, 9 and the corresponding minor holes 34, 19, decreasing the diameters of the damping holes 20, using elastic components 30 with smaller coefficients of elasticity, or reducing pre-loaded pressure to the elastic components 30. Also, an effective backpressure area of the return chamber may be increased by decreasing the surface areas of the signal chambers 1, 9.

The foregoing paragraphs described the buffering effect that occurs in the process that the piston 6 of the cylinder Z moves from the first half 3 of the chamber toward the second half 8 of the chamber. During this process, the signal generator X, which communicates with the second half 8 of the chamber, works and controls the second slide valve 18 to finish the buffering process. With reference to FIG. 3, when the piston 6 moves reversely from the second half 8 of the chamber toward the first half 3 of the chamber, it turns to the signal generator X which communicates with the first half 3 of the chamber to work and control the first slide valve 12 to finish the buffering process. Detailed description of the buffering process is under the same working principle with the buffering process mentioned above.

Figure 4:
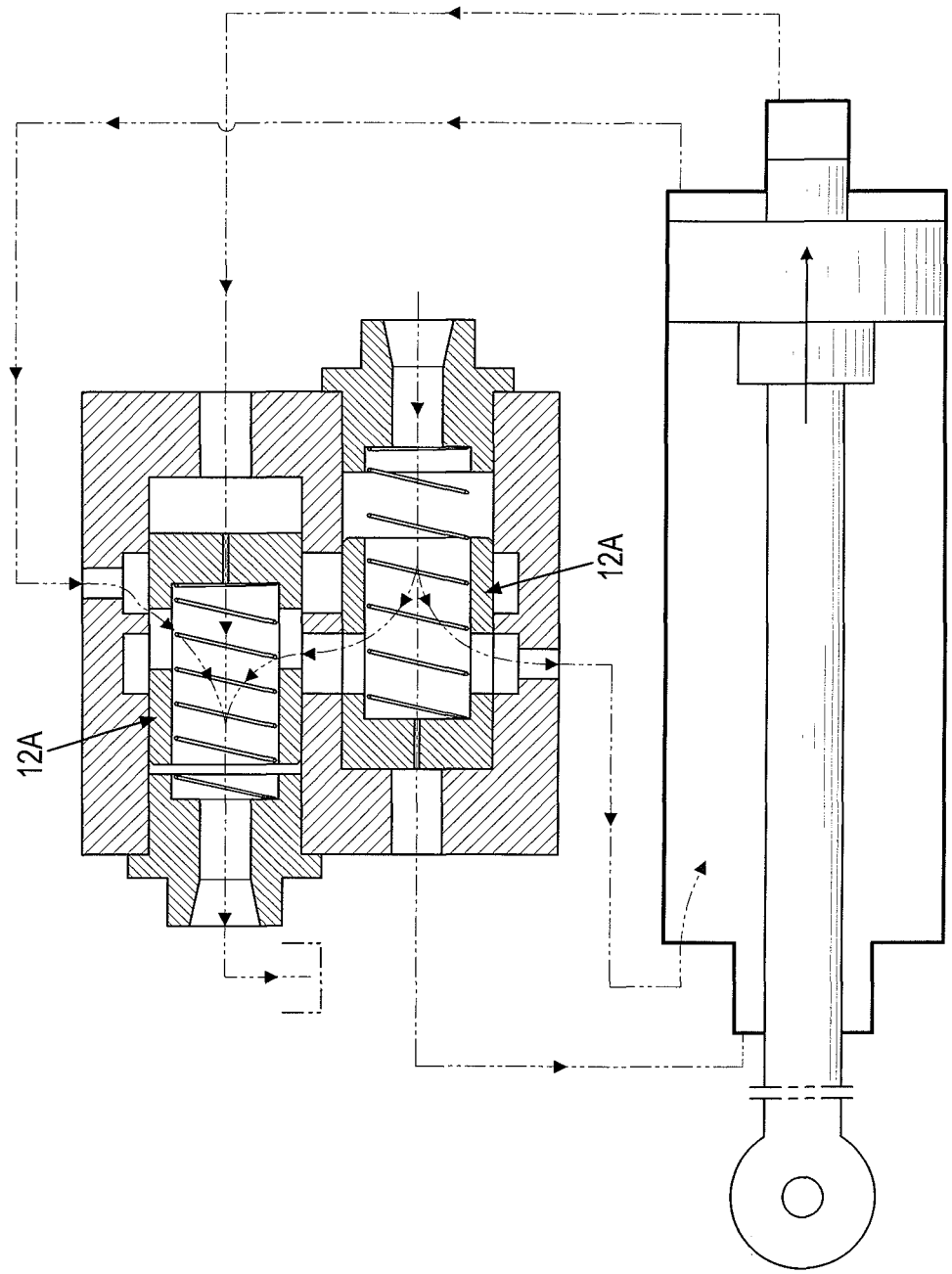
FIG. 4 is a side view in partial section of a substitute structure of the hydraulic system in FIG. 1, with the slide valves substituted with first valve cores.

Furthermore, with reference to FIG. 4, the two slide valves 12, 18 in Figs. 1 to 3 may be equivalently substituted with two valve cores 12A. The auxiliary surfaces 21 and the supplementary oil holes 22 of the slide valves 12, 18 are removed from the valve cores 12A. A mechanism for the buffering module Y with the valve cores 12A remains the same as the buffering module Y with the slide valves 12, 18, so the detailed description thereof will be omitted.

Figure 5:
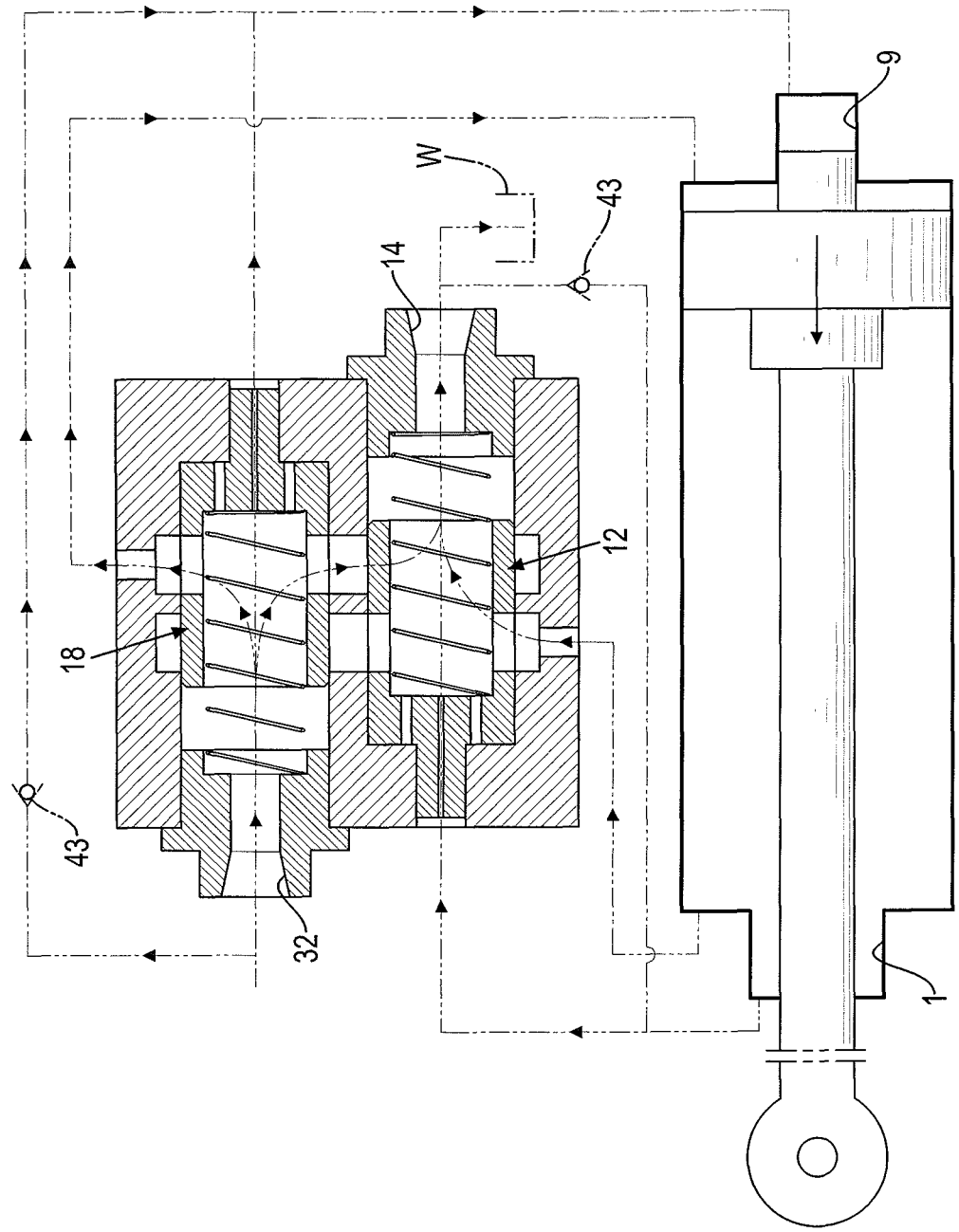
FIG. 5 is a side view in partial section of the hydraulic system in FIG. 1 equipped with check valves, so fast oil-filling is practicable.
Figure 6:
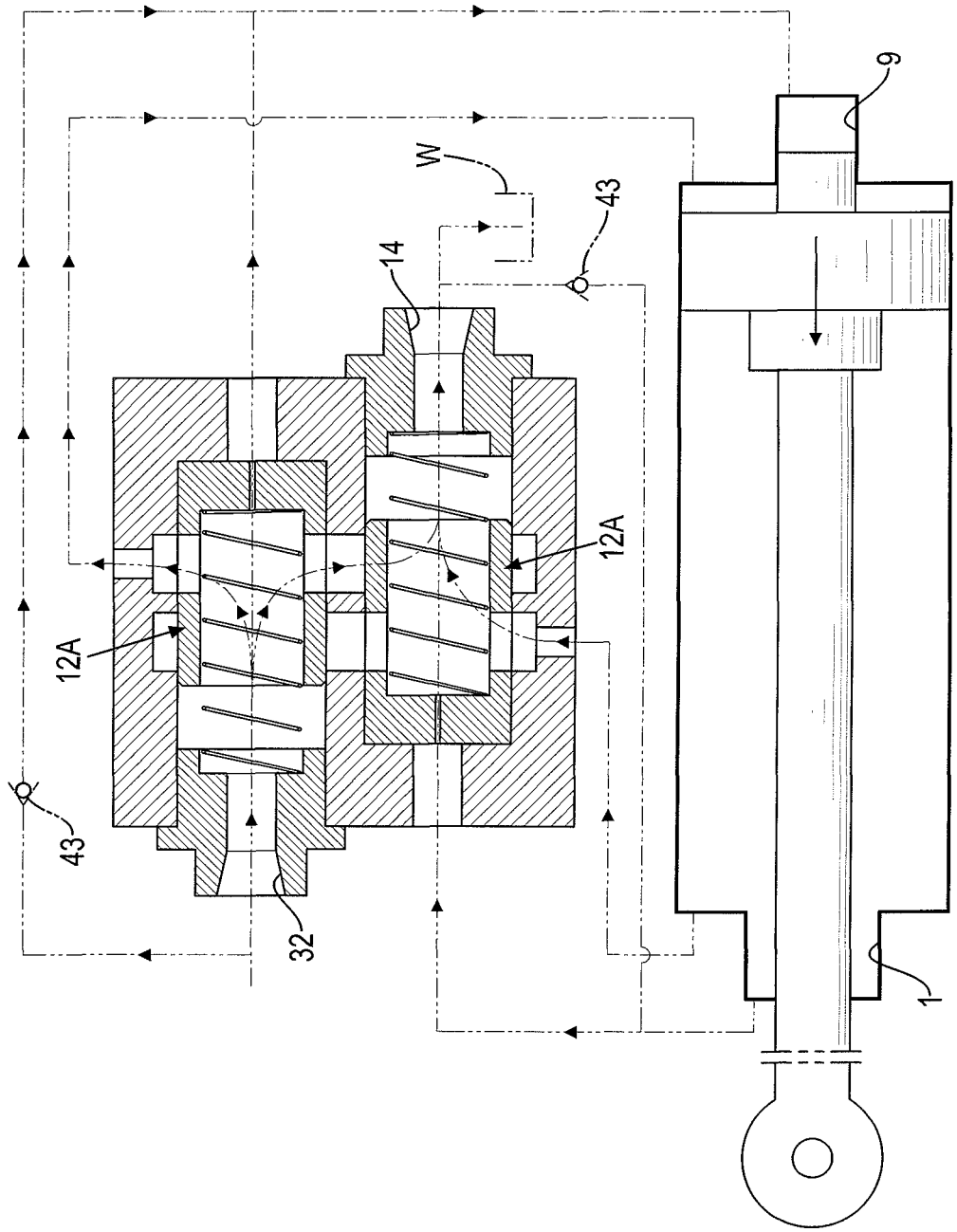
FIG. 6 is a side view in partial section of the hydraulic system in FIG. 4 equipped with check valves, so fast oil-filling is practicable.
Figure 7:
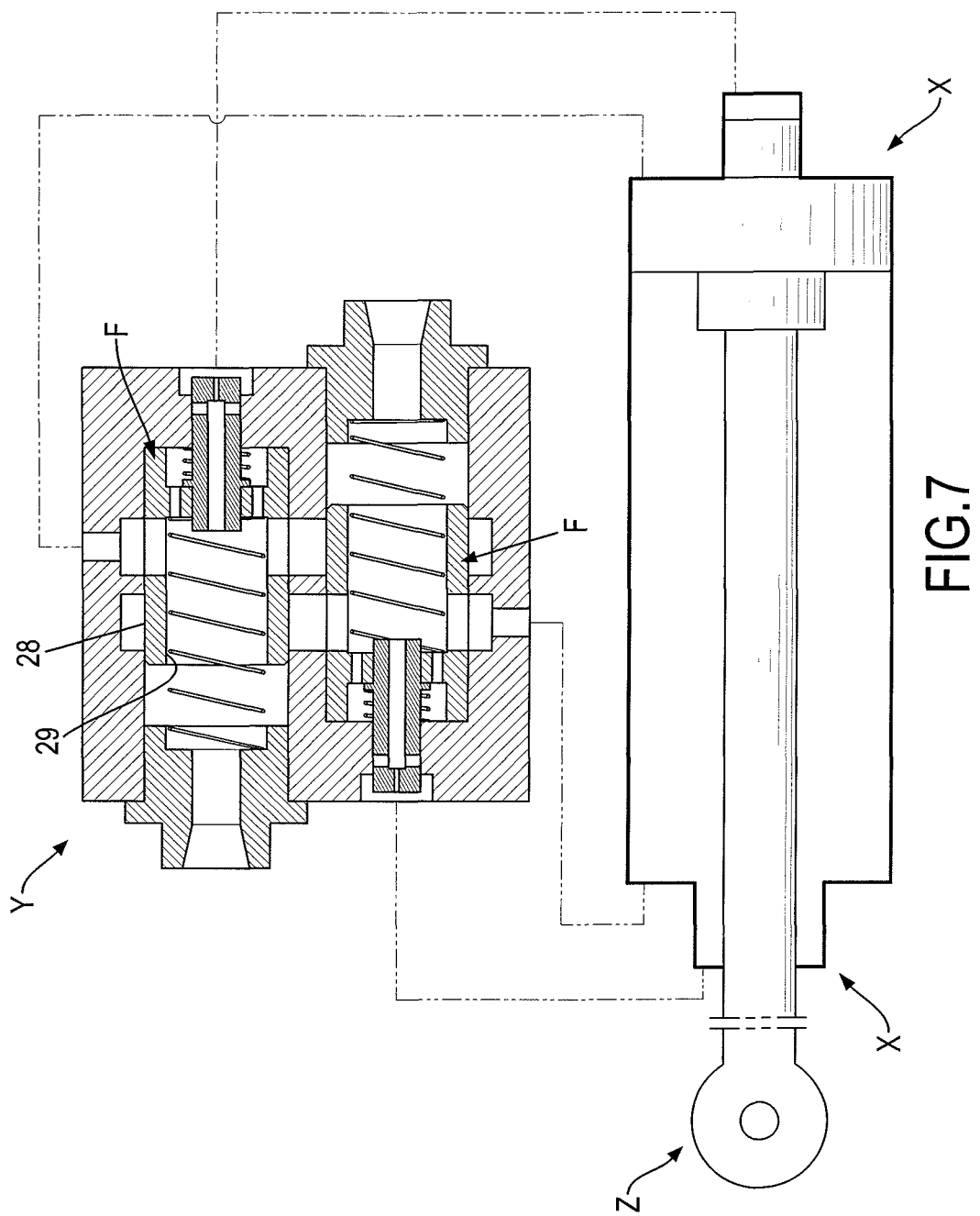
FIG. 7 is a side view in partial section of another substitute structure of the hydraulic system in FIG. 1 equipped with combined valves.

With reference to FIGS. 5 and 6, check valves 43 are selectively mounted between the first outer opening 14 and the first signal chamber 1 or between the second outer opening 32 and the second signal chamber 9 as shown in FIGS. 1 to 4, so oil may flow one way from the outer openings 14, 32 to the signal chambers 1, 9. With the check valves 43, the signal chambers 1, 9 of the signal generators X may be instantly refilled with oil, in case that oil being throttled at the damping holes 20 cannot flow into the signal chambers 1, 9 in time when the piston 6 moves reversely.

Additionally, a series of combined valves F may be obtained by revising the first and second slide valves 12, 18 and the valve cores 12A. The combined valves F are also equipped with functions of the check valves 43. Therefore, with reference to FIG. 7, the slide valves 12, 18, and the check valves 43 may be replaced by the combined valves F. With reference to FIGS. 7 and 8A to 8D, the combined valves F comprise a first combined valve F1, a second combined valve F2, a third combined valve F3, and a fourth combined valve F4 with respect to FIGS. 8A to 8D. Each one of the combined valves F has a valve sleeve and a check-valve rod. The valve sleeve preserves the characteristics of the cavities 29 and the valve surfaces 28 of the slide valves 12, 18, yet the auxiliary surfaces 21 are removed.

Besides, the valve sleeve has a linear guiding hole 50 or a conical guiding hole 50A, and a sunk hole 47. The linear guiding hole 50 and the conical guiding hole 50A are enlarged from the damping holes 20. The sunk hole 47 is axially disposed on the shoulder portion 42 of each one of the combined valves F. In addition, the sunk hole 47 selectively has the supplementary oil holes 22 communicating with it. According to these technical features, the valve sleeve has three configurations: a first valve sleeve 18A, a second valve sleeve 18B, and a third valve sleeve 18C. The first valve sleeve 18A has the linear guiding hole 50 and the sunk hole 47 with the supplementary oil holes 22. The second valve sleeve 18B has the linear guiding hole 50 and the sunk hole 47 without the supplementary oil holes 22. The third valve sleeve 18C has the conical guiding hole 50A and the sunk hole with the supplementary oil holes 22. The check-valve rod has four configurations: a first check-valve rod 21A, a second check-valve rod 21B, a third check-valve rod 21C, and a fourth check-valve rod 21D. The combined valves F1, F2, F3, F4 are combined from the three configurations of the valve sleeves 18A, 18B, 18C and the four configurations of the check-valve rod 21A, 21B, 21C, 21D.

Figure 8B:
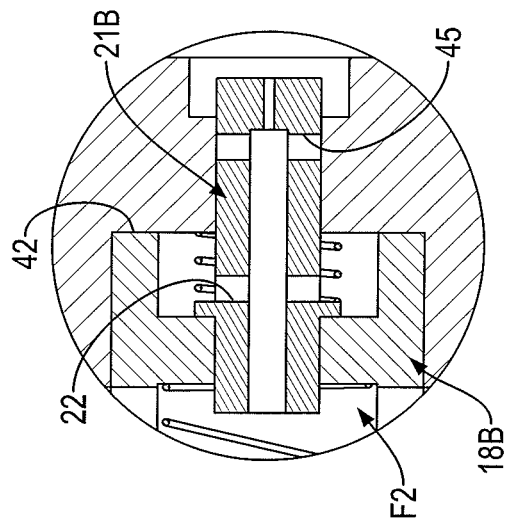
FIGS. 8A to 8D are enlarged side views in partial section of the combined valves in FIG. 7, with respect to four configurations of the combined valves.
Figure 8D:
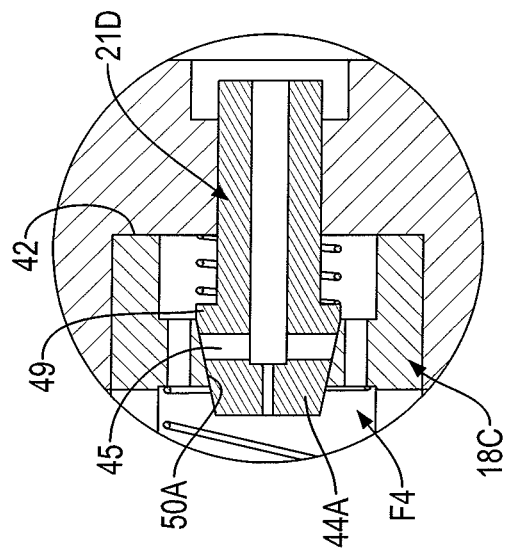
Figure 8A:
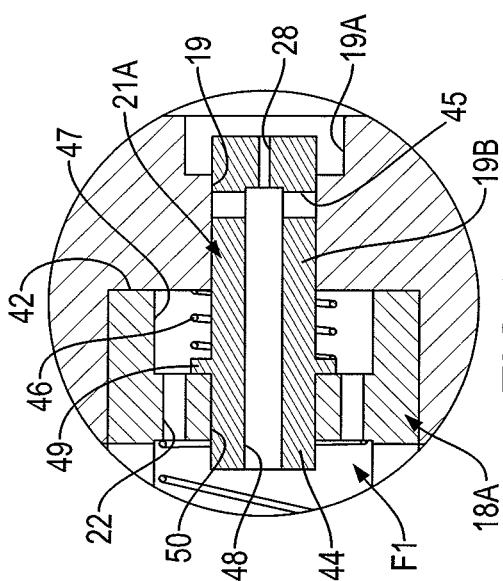
Figure 8C:
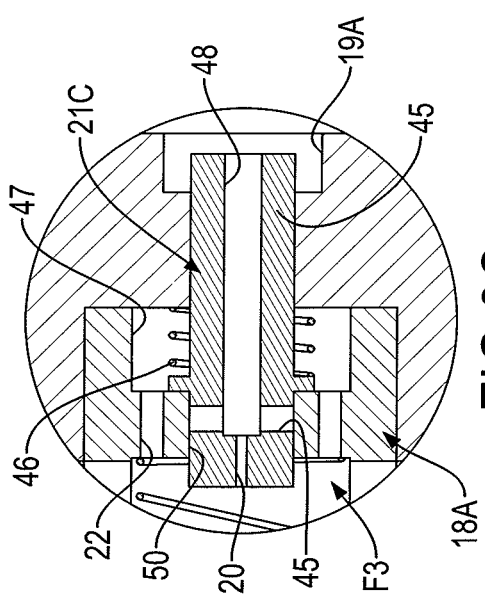
Figure 9:
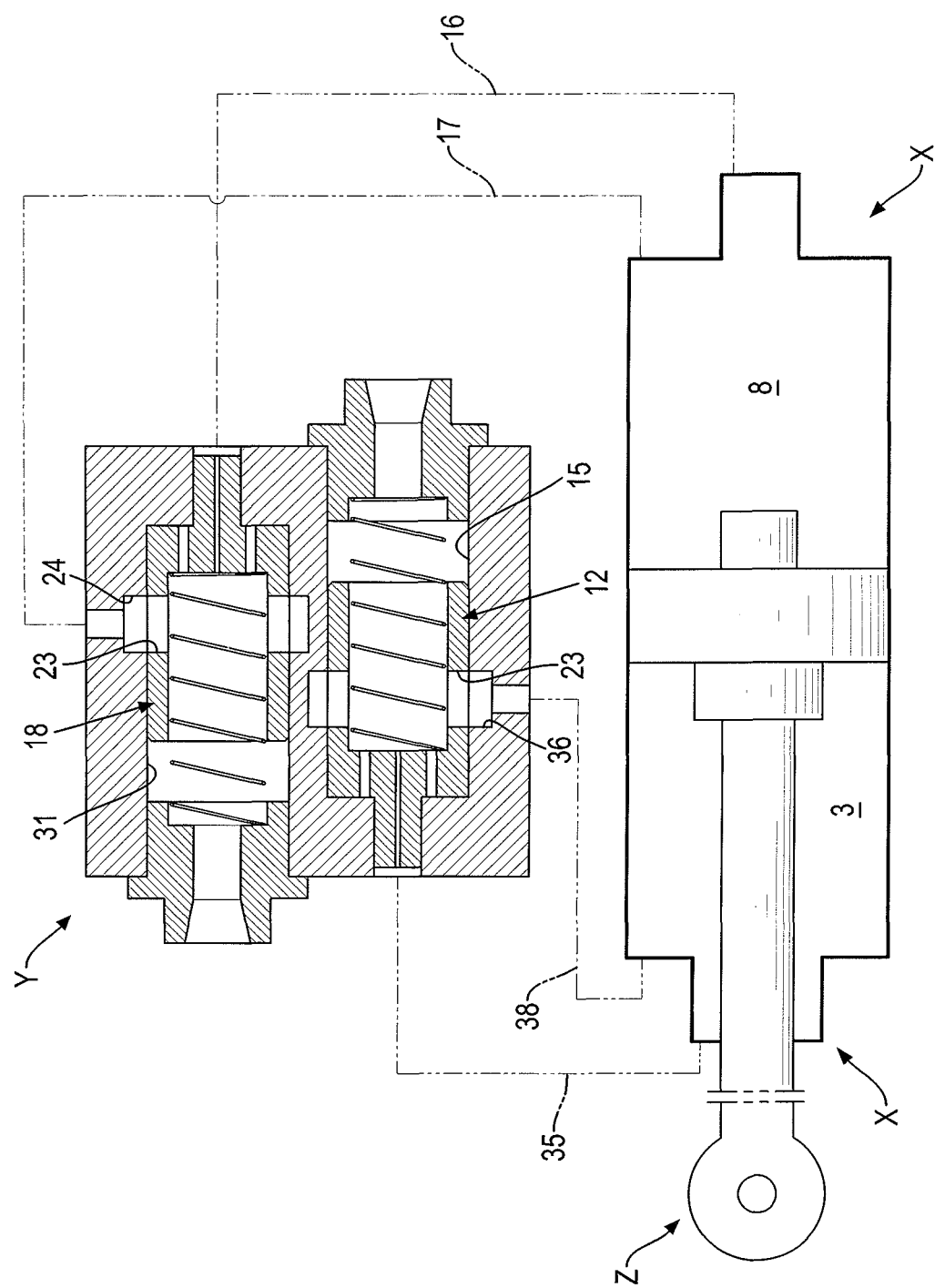
FIG. 9 is a side view in partial section of a second embodiment of a hydraulic buffer and a cylinder combined with the hydraulic buffer in accordance with the present invention.
Figure 10:
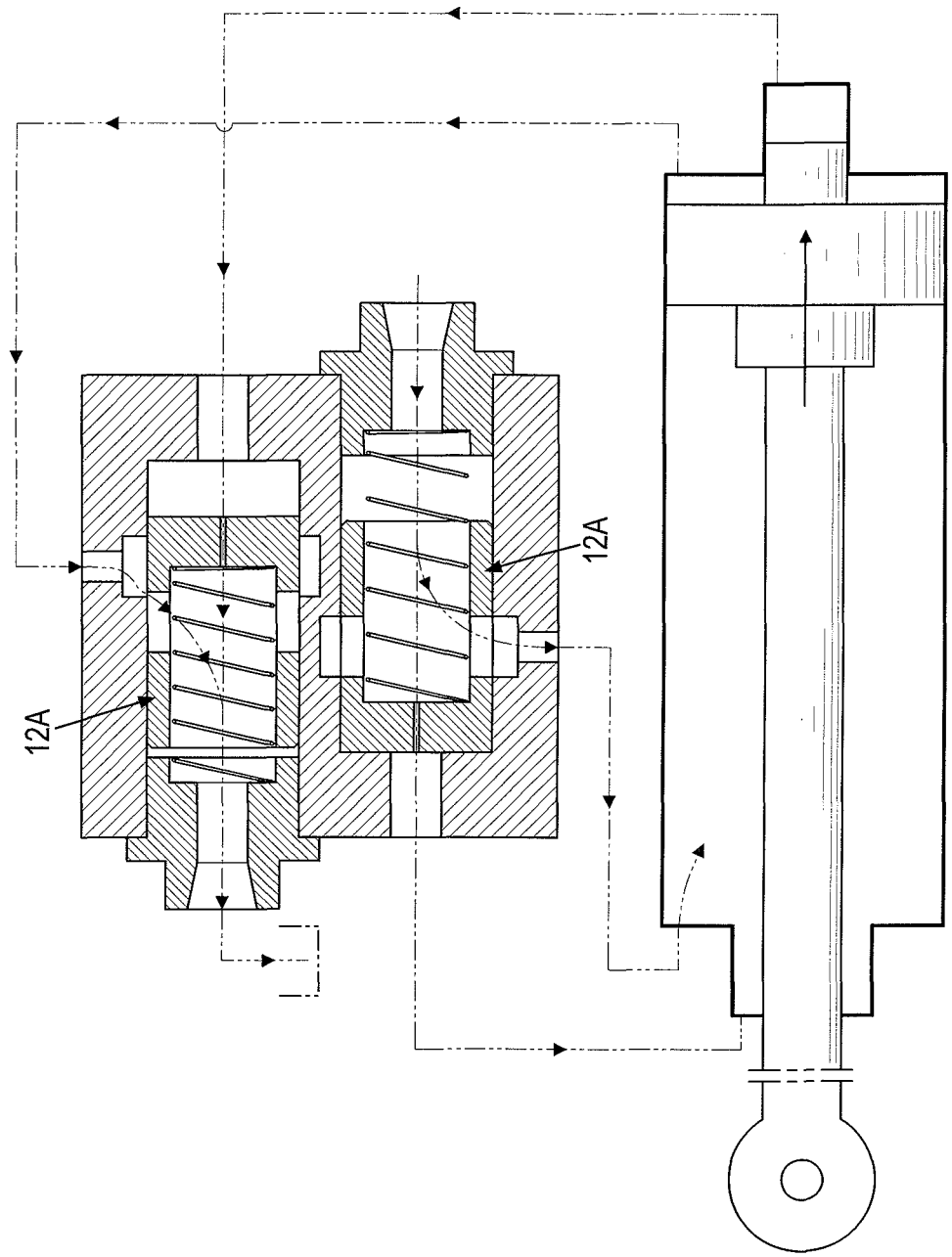
FIG. 10 is a side view in partial section of a substitute structure of the hydraulic system in FIG. 9, with the slide valve substituted with the first valve core.
Figure 11:
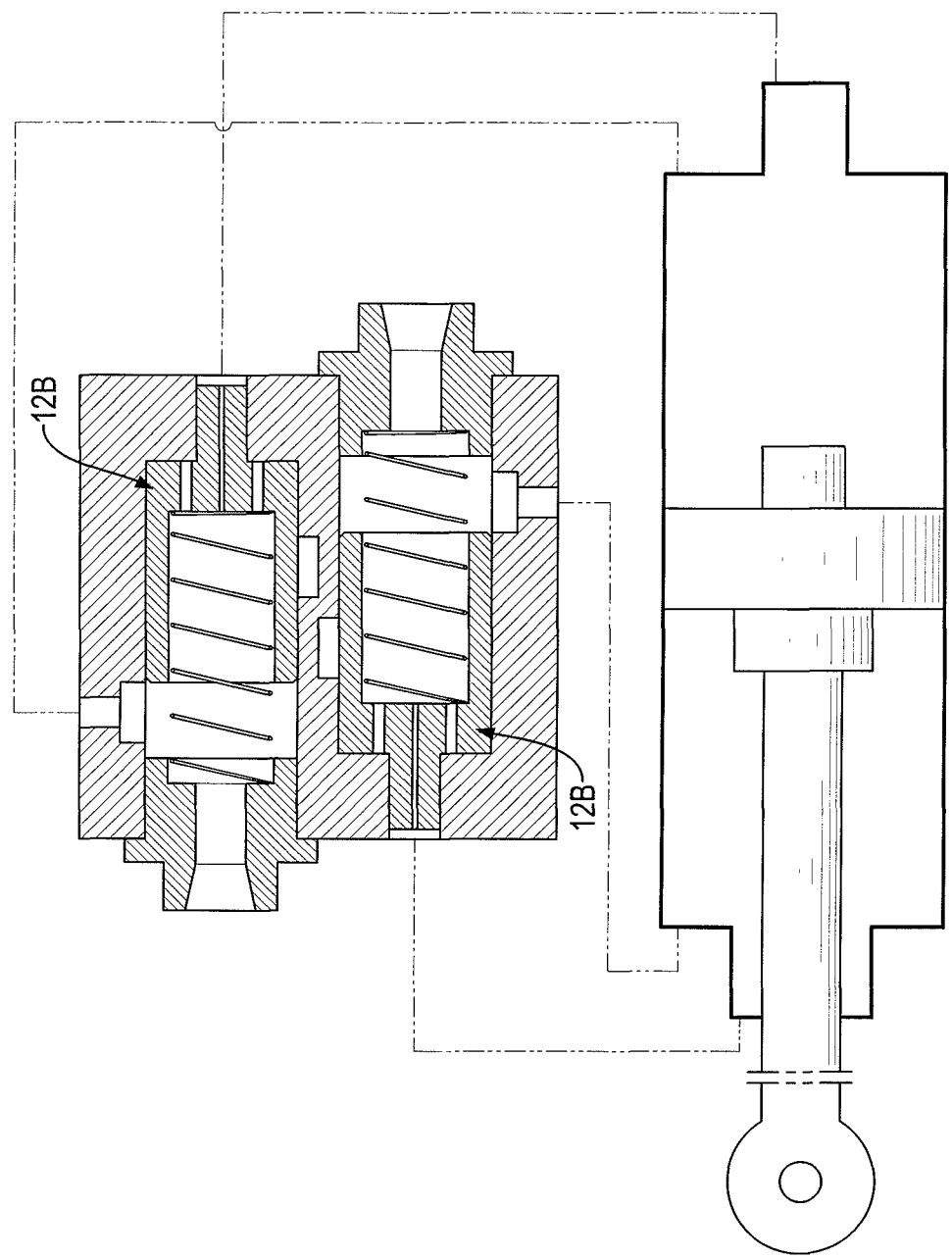
FIG. 11 is a side view in partial section of another substitute structure of the hydraulic system in FIG. 9, with the slide valve substituted with a second valve core.
Figure 12:
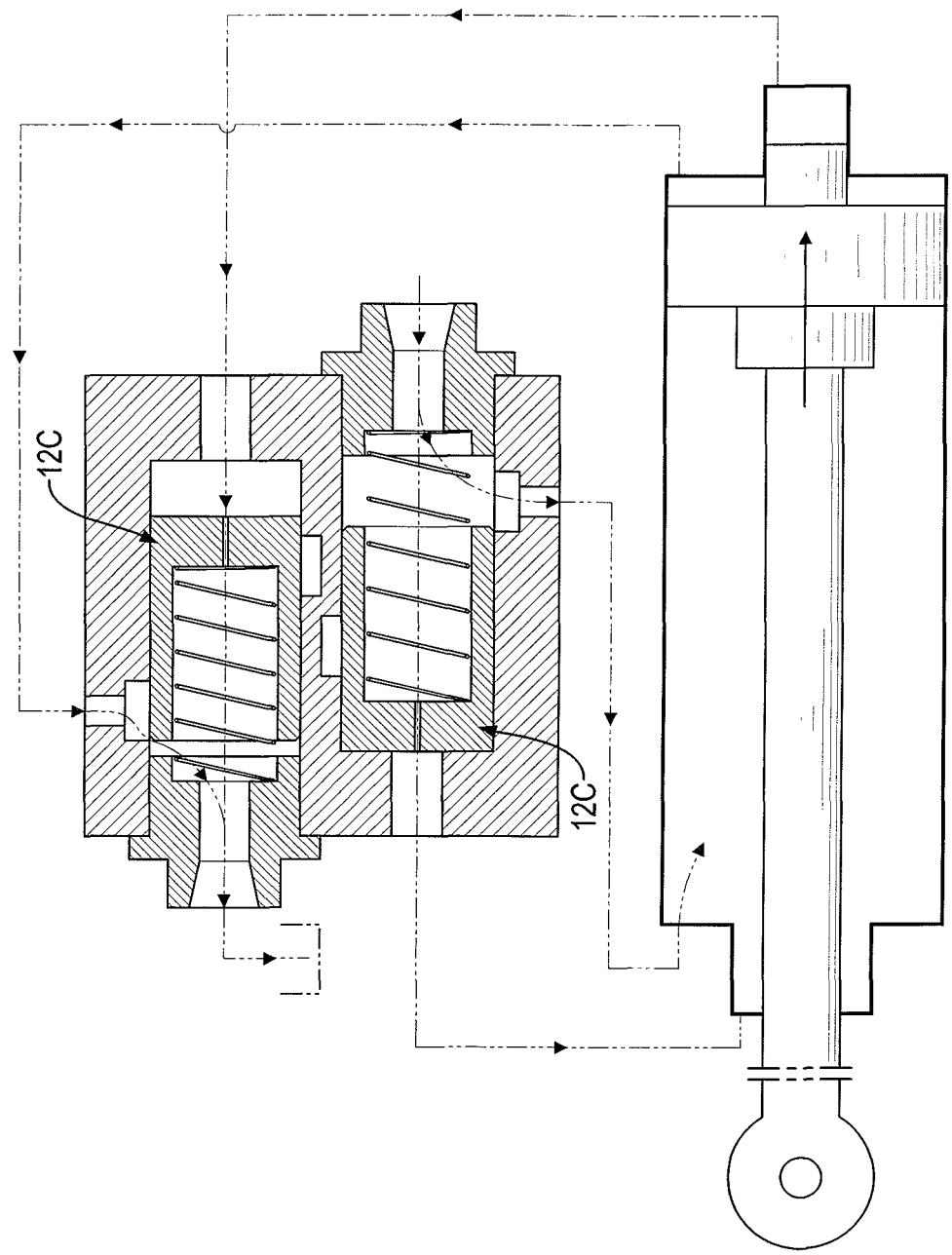
FIG. 12 is a side view in partial section of another substitute structure of the hydraulic system in FIG. 11, with the second valve core substituted with a third valve core.

With reference to FIG. 8A, the first combined valve F1 comprises a first valve sleeve 18A, a check-valve rod 21A, and an elastomer 46. The first check-valve rod 21A has a cylindrical body, a protrusion 49, a damping hole 20, a fast-filling channel 48, and multiple fast-filling holes 45. The cylindrical body comprises a guiding portion 44 and a piston portion 19B, which are respectively located on two different sides of the protrusion 49. The guiding portion 44 slides in the linear guiding hole 50 of the first valve sleeve 18A. The piston portion 19B slides in the second minor hole 19 of the valve body 10. The damping hole 20 and the fast-filling channel 48 are disposed at different ends through a center of the first check-valve rod 21A. The fast-filling holes 45 are radially disposed through the cylindrical body and communicate with the fast-filling channel 48 near the damping hole 20.

The elastomer 46 is pre-pressed and covers the piston portion 19B, with one end abutting the protrusion 49 and the other end abutting an interior surface at an end of the second minor hole 19. The protrusion 49 is therefore pressed and abuts a bottom of the sunk hole 47 of the first valve sleeve 18A. In order to coordinate the first combined valve F1, the valve body 10 further has a fast-filling groove 19A. The fast-filling groove 19A is disposed at an exterior end of the second minor hole 19, and extends in a radial direction. Besides, the fast-filling groove 19A is connected to one of the signal generators X via oil lines. Generally, the fast-filling holes 45 are located in the second minor hole 19, thereby blocking the communication to the fast-filling groove 19A. The oil in the fast-filling channel may only flow to the fast-filling groove 19A through the damping hole 20 as in a closed status. When the check-valve rod 21A moves toward the fast-filling groove 19A, the fast-filling hole 45 will gradually communicate with the fast-filling groove 19A. The oil in the fast-filling channel 48 may flow into the corresponding signal chamber 1, 9 of the signal generator X through the fast-filling hole 45 and the fast-filling groove 19A, as in an open status. The elastomer 46 may be a wire spring, a flat spring, an elastic rubber, etc. and that may restore the check-valve rod 21A.

Second Embodiment

Figure 13:
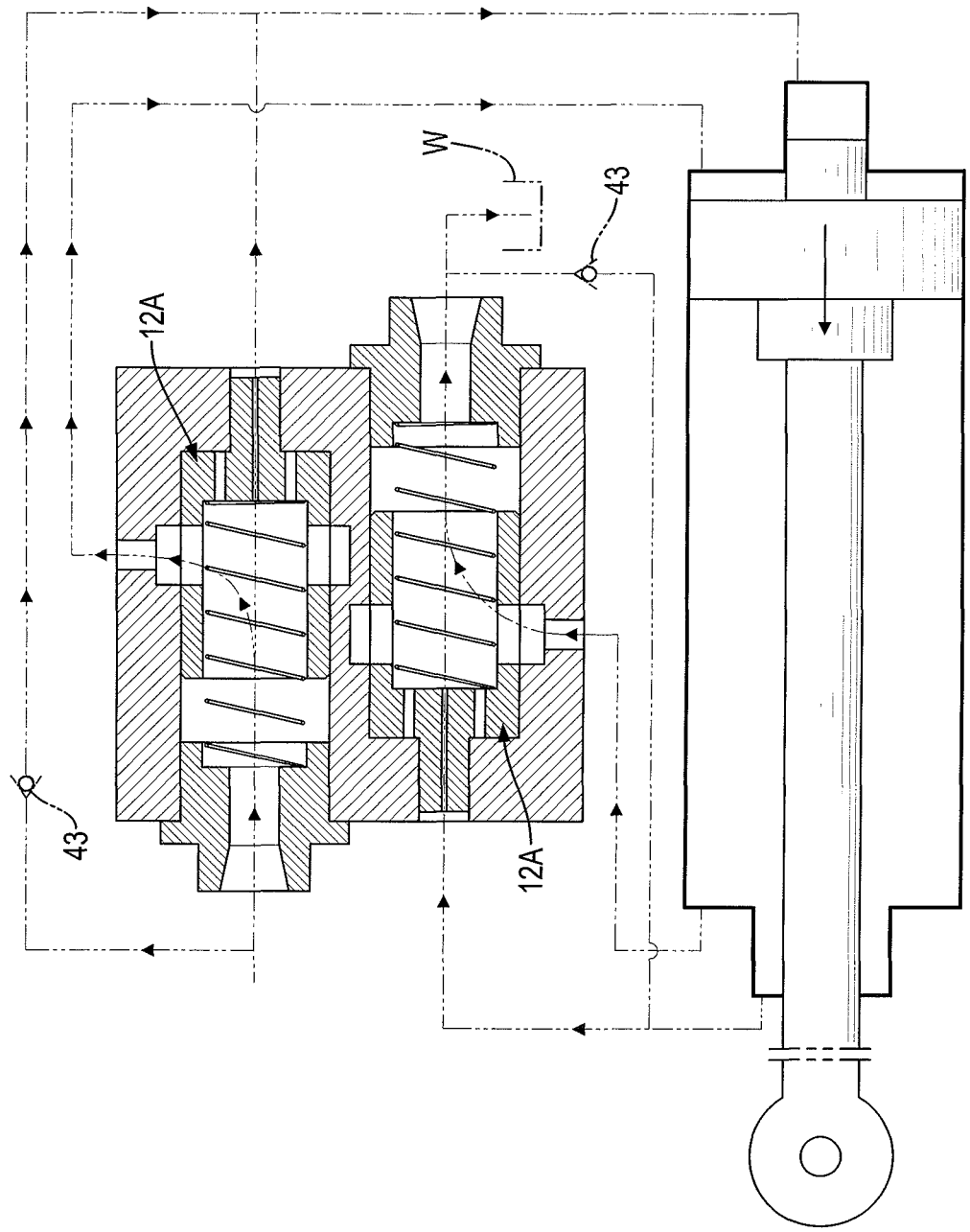
FIG. 13 is a side view in partial section of a further substitute structure of the hydraulic system in FIG. 9 equipped with check valves, so fast oil-filling is practicable.
Figure 14:
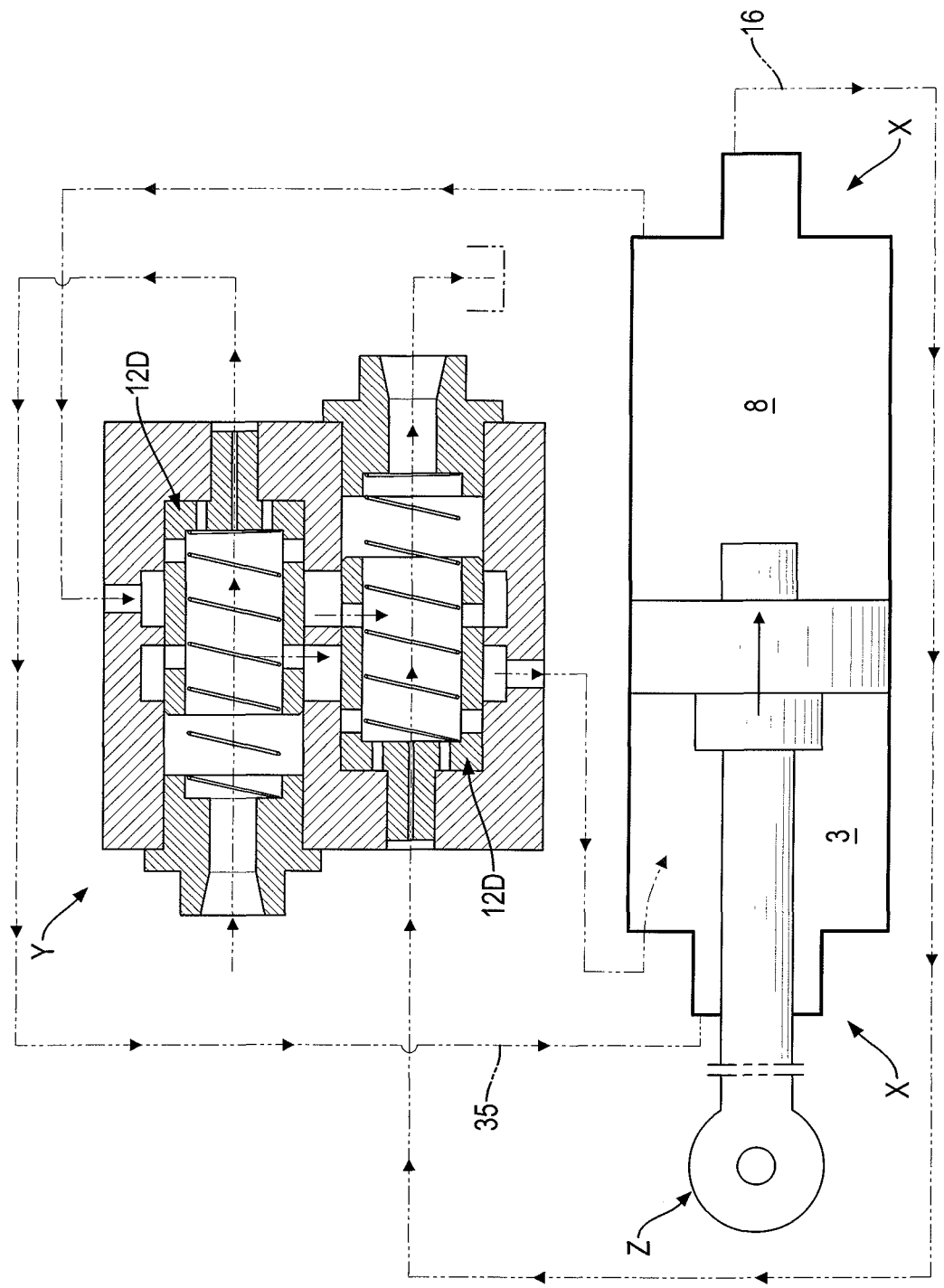
FIG. 14 is a side view in partial section of a third embodiment of a hydraulic buffer and a cylinder with the hydraulic buffer combined in accordance with the present invention.
Figure 15:
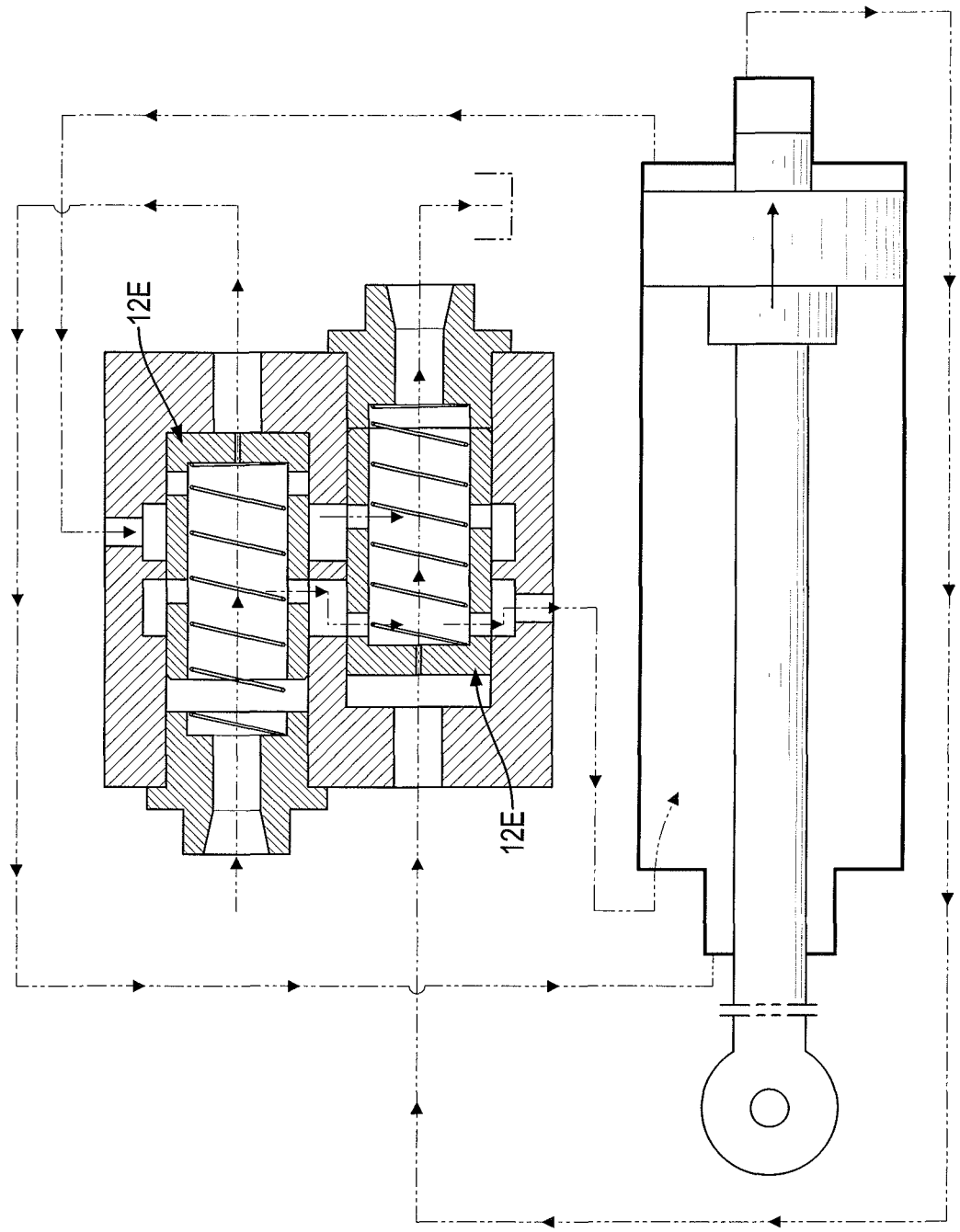
FIG. 15 is a side view in partial section of a substitute structure of the hydraulic system in FIG. 14, with the valve core substituted with a valve core.
Figure 16:
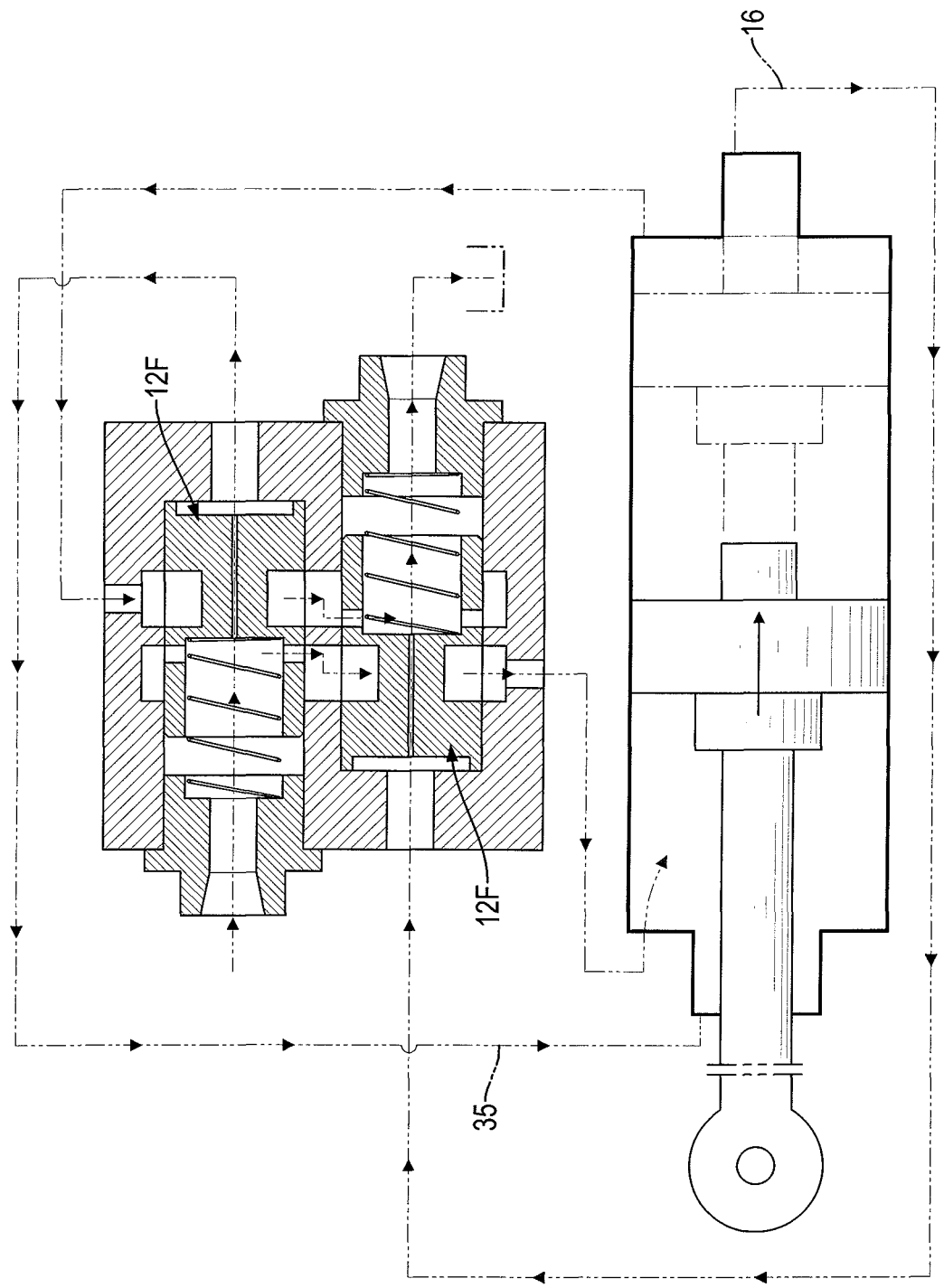
FIG. 16 is a side view in partial section of another substitute structure of the hydraulic system in FIG. 14, with the valve core substituted with a valve core.
Figure 17:
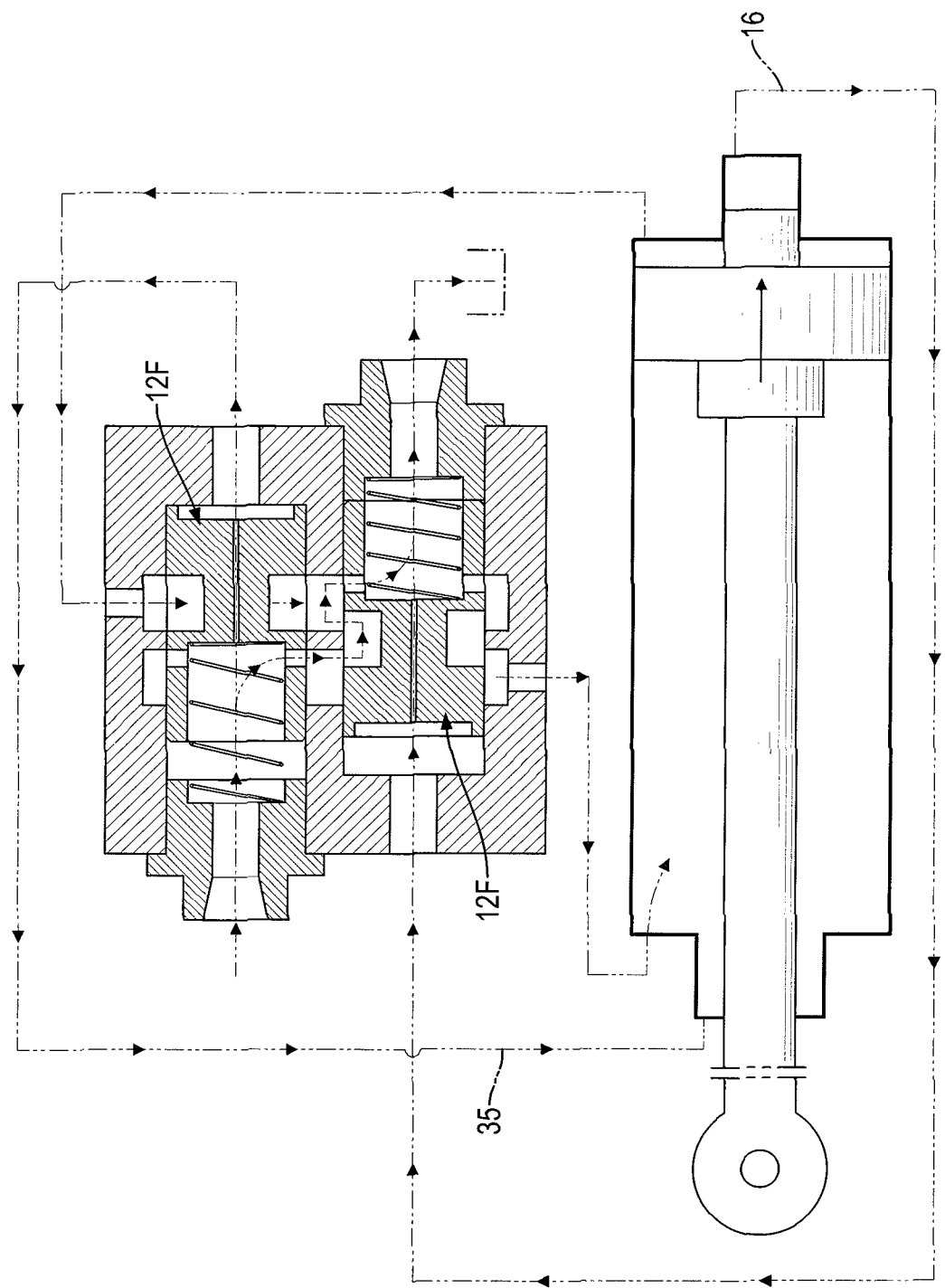
FIG. 17 is a side view in partial section of the second plug that has moved into the second signal chamber of the hydraulic system in FIG. 16, and shows that the hydraulic buffer is working.

With reference to FIGS. 9 to 13, a second embodiment of the hydraulic buffer has two signal generators X and a buffering module Y. The buffering module Y has two slide valves 12, 18 respectively connected to the two signal generators X. The two signal generators X are disposed in a first half 3 of the chamber and a second half 8 of the chamber of a cylinder Z, and are connected to the two slide valves 12, 18, respectively, via oil lines 16, 35. By throttling backpressure of a return chamber, a moving velocity of a piston of the cylinder Z may be controlled, and a bidirectional buffering effect may be achieved. The second embodiment differs from the first embodiment in that: only the two major oil grooves 24, 36 of the two major holes 15, 31 are preserved. The two minor oil grooves 11, 27 and the two channels 26, 33 are omitted. The slide valves 12, 18 may also be replaced with three configurations of valve cores 12A, 12B, 12C. A first valve core 12A only omits the auxiliary surface 21 and the supplementary oil holes 22 from the slide valves 12, 18. A second valve core 12B removes the main oil holes 23 from the slide valves 12, 18. A third valve core 12C removes the auxiliary surface 21, the supplementary oil holes 22, and the main oil holes 23 from the slide valves 12, 18. Other technical characteristics are the same as the method of throttling backpressure of a return chamber of the first embodiment. With reference to FIG. 13, similar to the first embodiment, the check valves 43 are selectively mounted between the two outer openings 14, 32 and the corresponding signal chambers 1, 9. Therefore, the signal chambers 1, 9 may be instantly refilled with oil through the check valves 43.

Third embodiment

Figure 18:
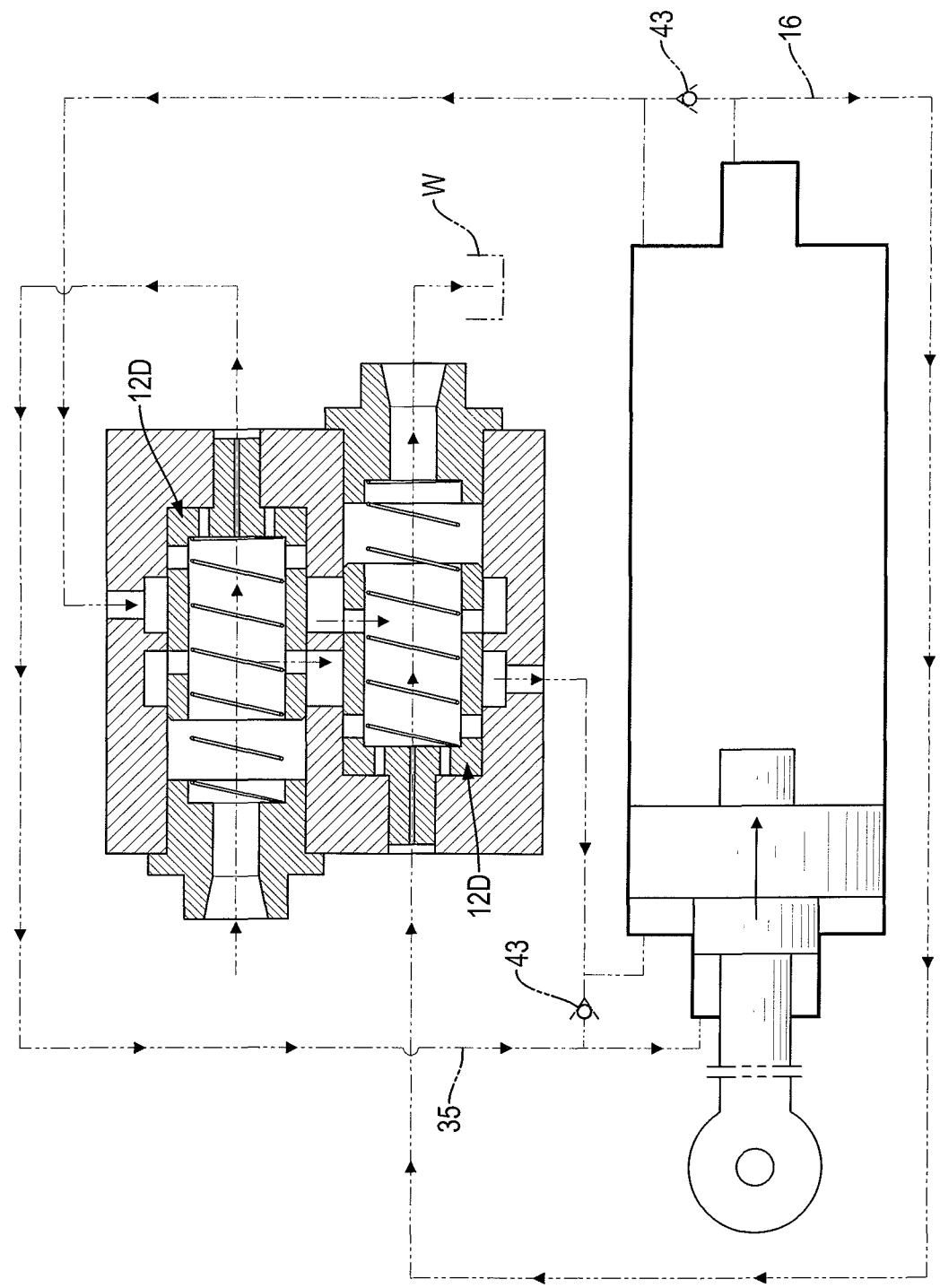
FIG. 18 is a side view in partial section of a further substitute structure of the hydraulic system in FIG. 14 equipped with check valves, so fast oil-filling is practicable.

With reference to FIGS. 14 to 18, a third embodiment of the hydraulic buffer has two signal generators X and a buffering module Y. The buffering module Y has two slide valves 12, 18 respectively connected to the two signal generators X. The two signal generators X are disposed in a first half 3 of the chamber and a second half 8 of the chamber of a cylinder Z, respectively, and are each connected to a respective one of the two slide valves 12, 18 via the oil lines 16, 35. By pressure-relief unloading of a pressure chamber, a moving velocity of a piston of the cylinder Z may be controlled, and a bidirectional buffering effect may be achieved. In comparison with the first embodiment of the present invention, the slide valves 12, 18 are respectively replaced with a fourth valve core 12D, a fifth valve core 12E, and a sixth valve core 12F. Also, connection of oil lines differs in that the two signal chambers 1, 9 are respectively connected with the minor holes 34, 19 by the oil lines 16, 35. Other technical characteristics are the same as the method of pressure-relief unloading of a pressure chamber of the first embodiment. With reference to FIG. 18, similar to the first embodiment, the check valves 43 are selectively mounted between the two side openings 37, 25 and the corresponding signal chambers 1, 9. Therefore, the signal chambers 1, 9 may be instantly refilled with oil through the check valves 43.

Fourth embodiment

Figure 19:
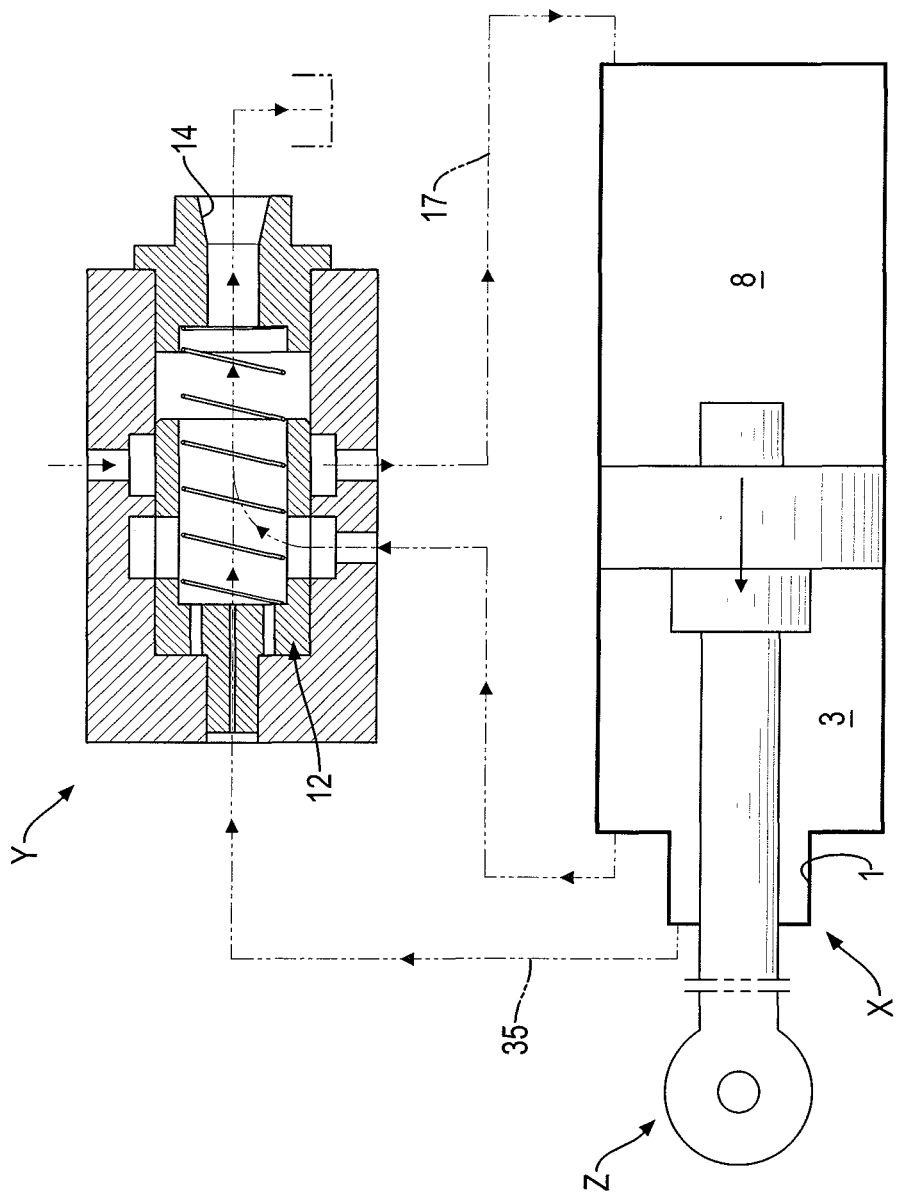
FIG. 19 is a side view in partial section of a fourth embodiment of a hydraulic buffer and a cylinder combined in accordance with the present invention, and the slide valve is utilized.
Figure 20:
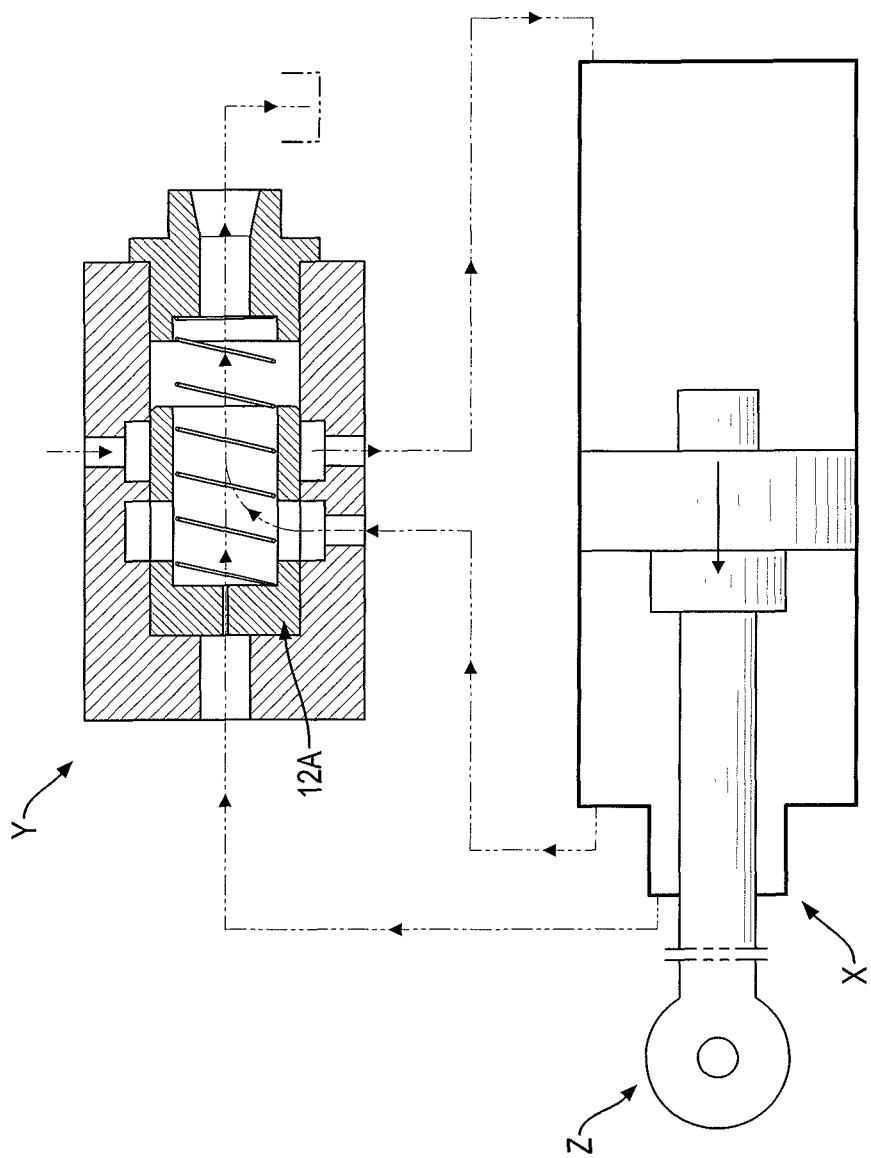
FIG. 20 is a side view in partial section of a substitute structure of the hydraulic system in FIG. 19, with the slide valve substituted with the first valve core.
Figure 21:
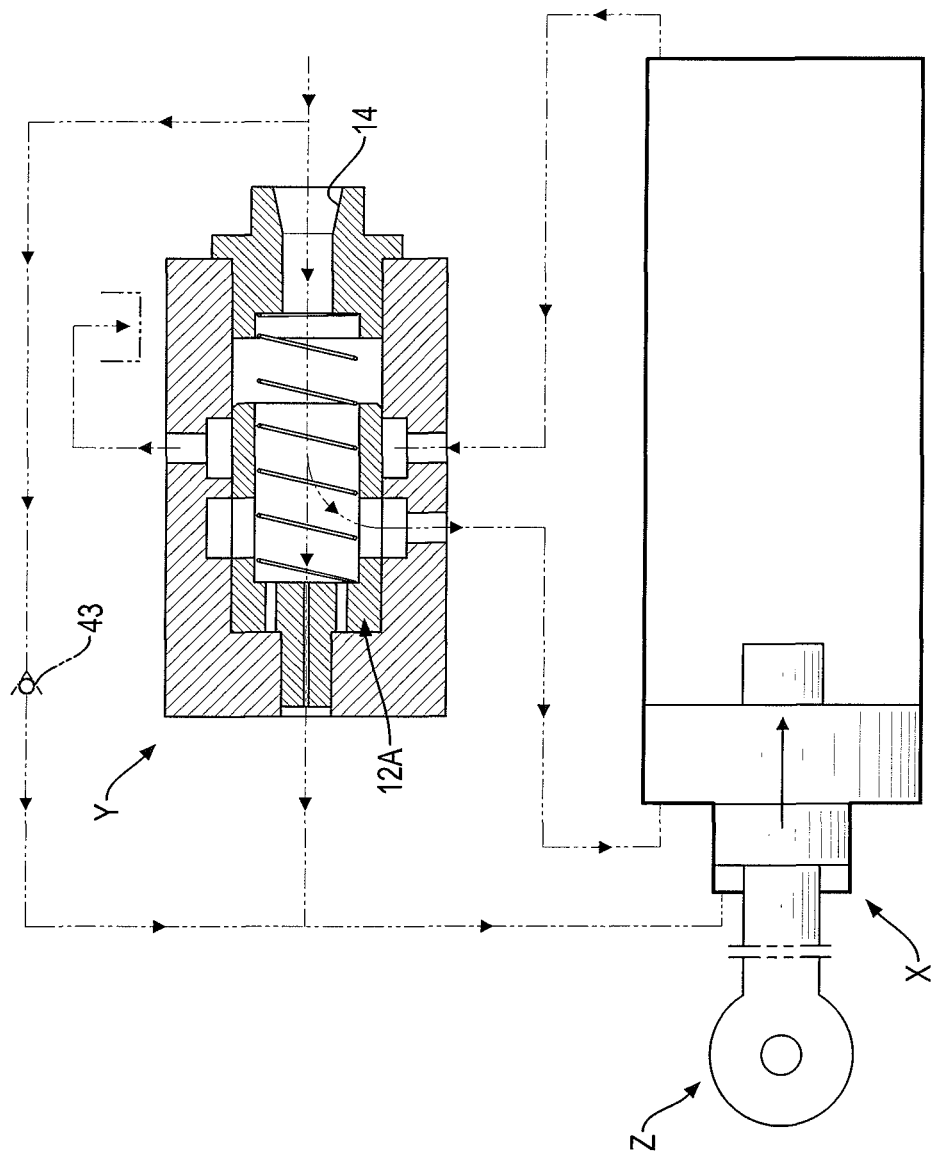
FIG. 21 is a side view in partial section of another substitute structure of the hydraulic system in FIG. 19 equipped with check valves, so fast oil-filling is practicable.
Figure 22:
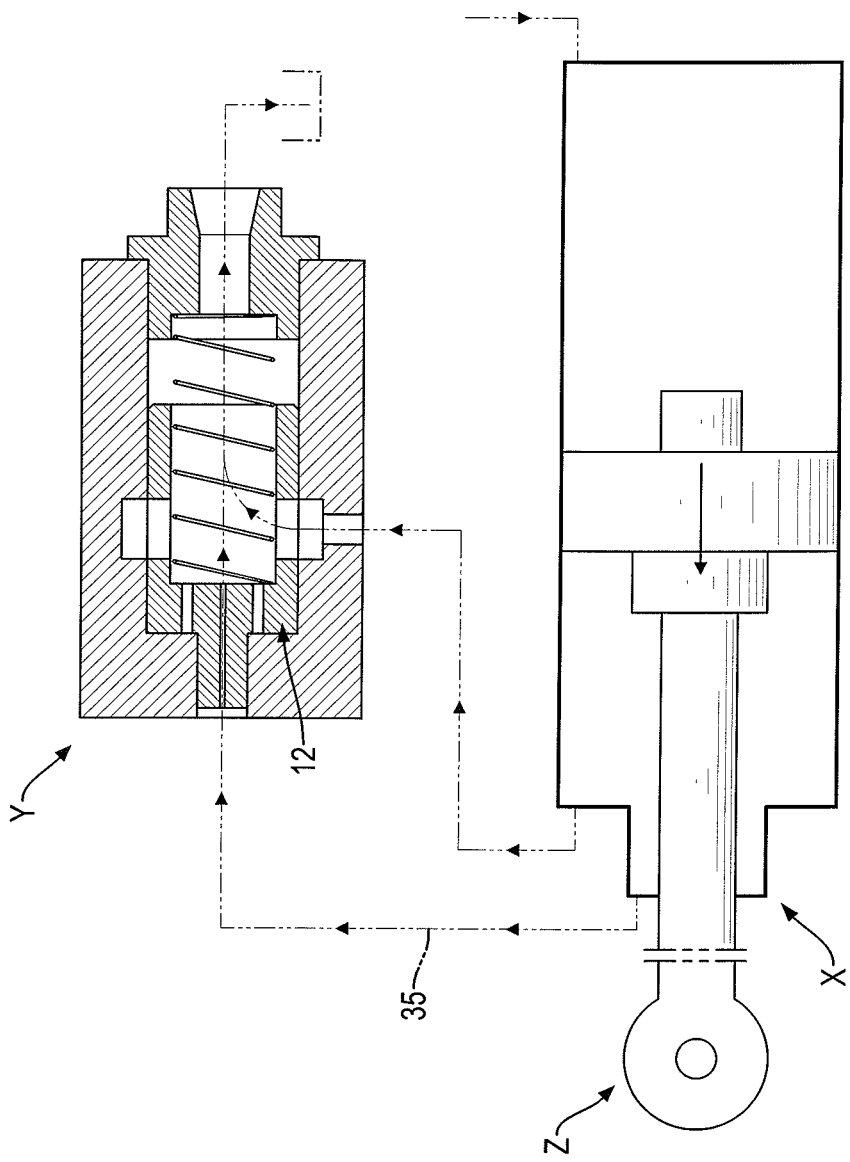
FIG. 22 is a side view in partial section of a fifth embodiment of a hydraulic buffer and a cylinder combined in accordance with the present invention.
Figure 23:
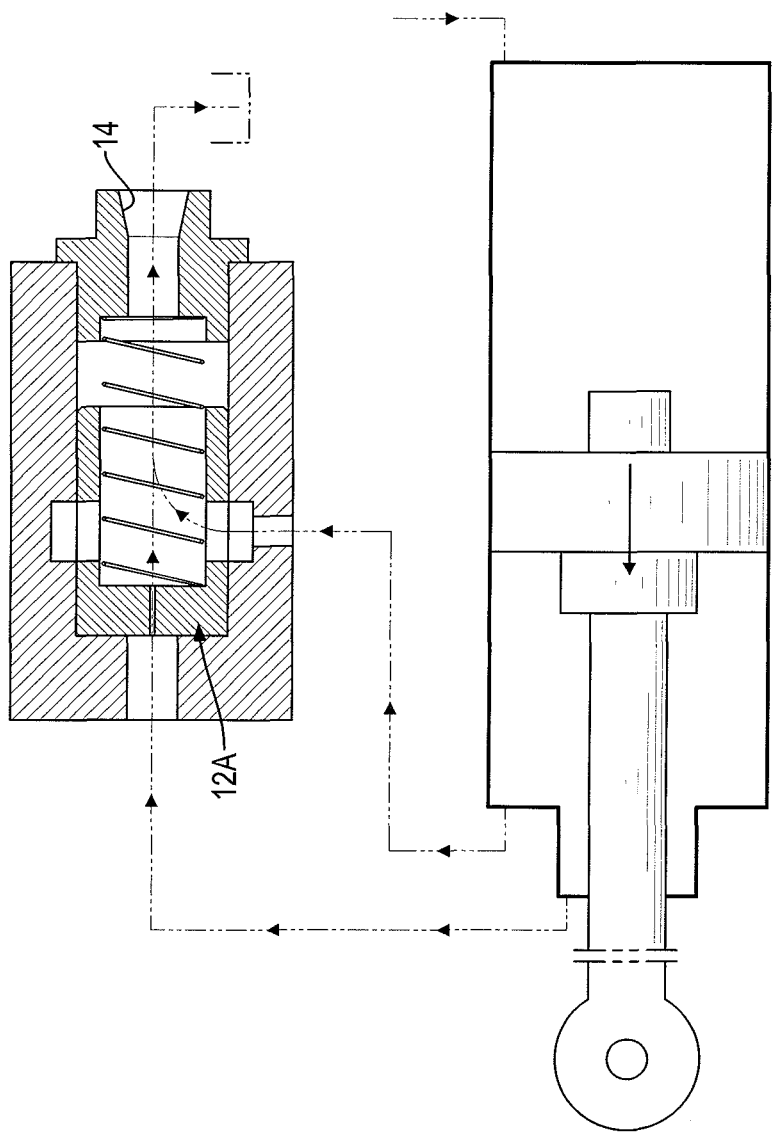
FIGS. 23 to 25 show three substitute structures which replace the slide valve with the first valve core, the second valve core, and the third valve core.
Figure 24:
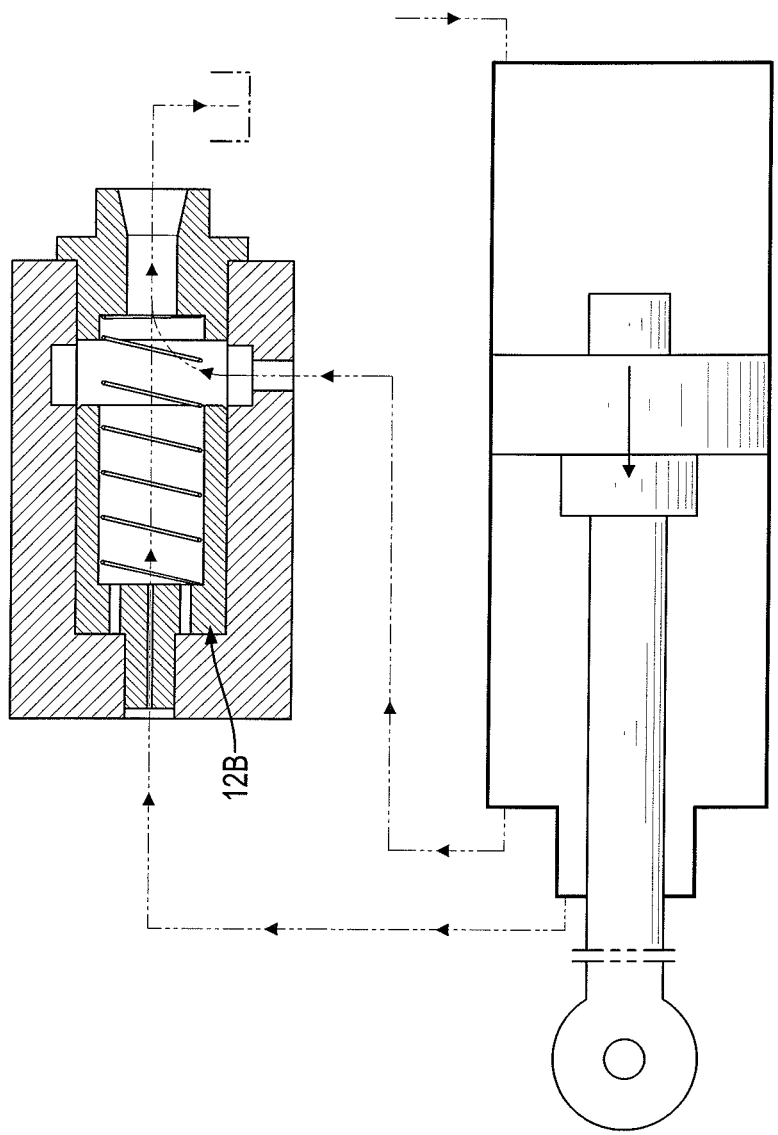
Figure 25:
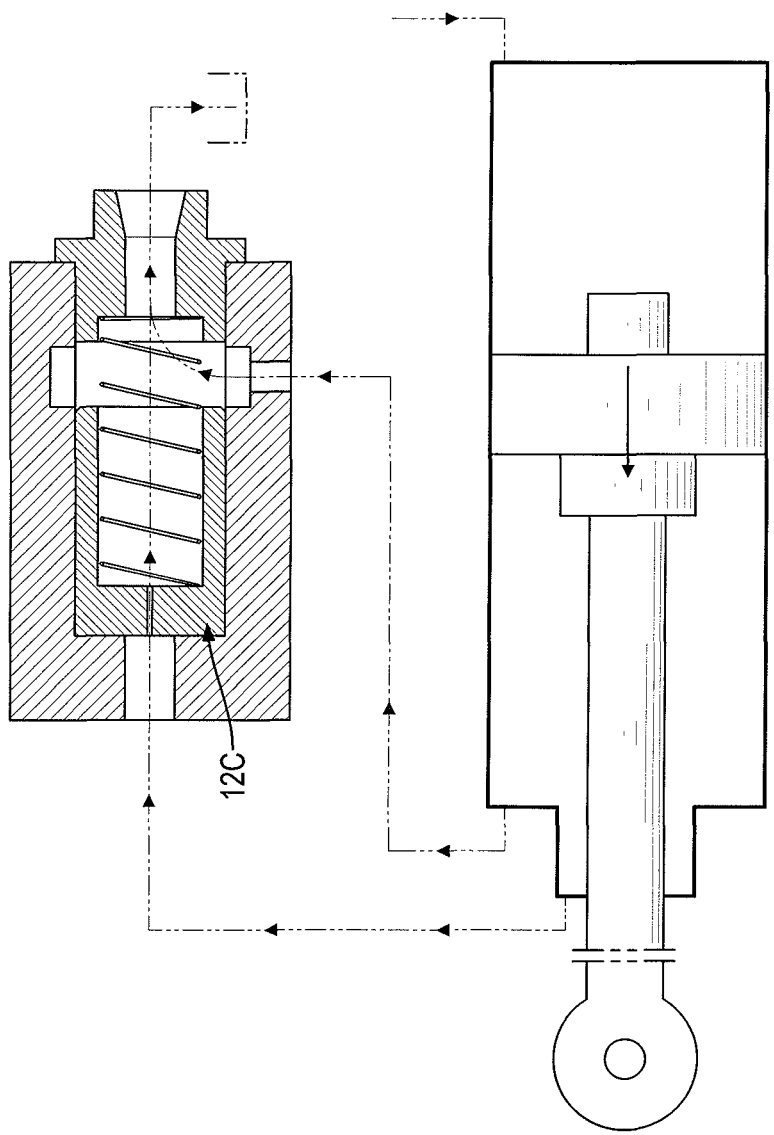

With reference to FIGS. 19 to 21, a fourth embodiment of the hydraulic buffer has a signal generator X and a buffering module Y. The buffering module Y has a slide valve. The signal generator X is disposed in a first half 3 of the chamber or a second half 8 of the chamber of a cylinder Z, and controls movements of the first slide valve 12 via an oil line. By the methods of pressure-relief unloading of a pressure chamber and throttling backpressure of a return chamber, a moving velocity of a piston of the cylinder Z may be controlled, and a unidirectional buffering effect may be achieved. With reference to FIG. 19, the first slide valve 12 and the signal generator X in the first half 3 of the chamber are used for demonstration. FIG. 19 shows structural relationships between the first slide valve 12 and the first major hole 15 of the hydraulic system along with flowing directions of oil under a non-buffering status.

Further, with reference to FIG. 20, the first valve 12 shown in FIG. 19 may be replaced with the valve core 12A.

Furthermore, with reference to FIG. 21, a check valve 43 may be mounted between the first outer opening 14 and the first signal chamber 1 of FIGS. 19 and 20, for oil to flow one-way to the first signal chamber 1 from the first outer opening 14. When the piston of the cylinder Z starts to move in a reverse direction, oil from the first outer opening 14 may surpass the damping hole 20 and flow rapidly to the first signal chamber 1 of the signal generator X through the check valve 43, in case that the oil is throttled by the damping hole 20 and is unable to fill the first signal chamber 1 in time.

Moreover, the substitution choices of the slide valves 12, 18 in the first embodiment as shown in FIG. 8 may also be applied to the fourth embodiment of the present invention. The aforementioned slide valve 12 and the valve core 12A may be assembled with the check valve 43 and be further adapted as a combined valve F. Besides preserving functions of the first slide valve 12, the combined valve F is also equipped with a function of the check valve 43 that may refill the first signal chamber 1 with oil rapidly. A check-valve rod of the combined valve F may be chosen from the first check-valve rod 21A, the second check-valve rod 21B, the third check-valve rod 21C, and the fourth check-valve rod 21D, the same as the first embodiment of the present invention.

Fifth Embodiment

With reference to FIGS. 22 to 26, a fifth embodiment of the hydraulic buffer has a signal generator X and a buffering module Y. The buffering module Y has a slide valve. The signal generator X is disposed in a first half 3 of the chamber or a second half 8 of the chamber of a cylinder Z, and controls movements of the first slide valve 12 via an oil line 35. By the method of throttling backpressure of a return chamber, a moving velocity of a piston of the cylinder Z may be controlled, and a unidirectional buffering effect may be achieved. In FIGS. 22 to 26, the first signal chamber 1 disposed in the first half 3 of the chamber is adopted for demonstration. The slide valve may be chosen from the first slide valve 12, the first valve core 12A, the second valve core 12B, and the third valve core 12C of the second embodiment. When the piston of the cylinder Z moves to an end of a stroke in the first half 3 of the chamber, a buffering effect may be provided. Detailed description of working mechanism is the same as the second embodiment, and is thereof omitted.

Figure 26:
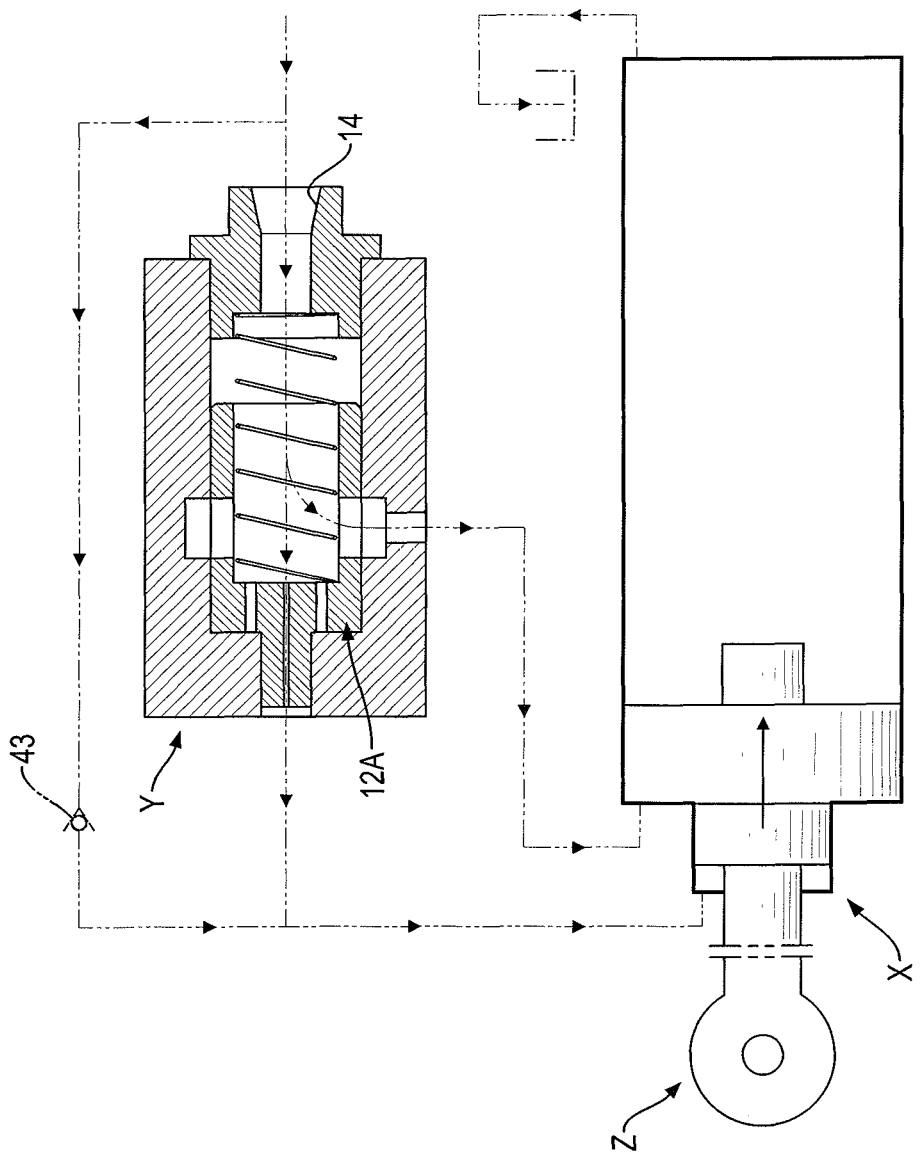
FIG. 26 is a side view in partial section of a further substitute structure of the hydraulic system in FIG. 22 equipped with check valves, so fast oil-filling is practicable.

Furthermore, with reference to FIG. 26, a check valve 43 may be mounted between the first outer opening 14 and the first signal chamber 1 in FIGS. 22 to 25, for oil to flow one-way to the first signal chamber 1 from the first outer opening 14. When the piston of the cylinder Z starts to move in a reverse direction, oil from the first outer opening 14 may surpass the damping hole 20 and flow rapidly to the first signal chamber 1 of the signal generator X through the check valve 43, in case that the oil is throttled by the damping hole 20 and is unable to fill the first signal chamber 1 in time. A larger negative pressure may occur if the oil fails to fill the first signal chamber 1 in time.

Moreover, the substitution choices of the slide valves 12, 18 in the first embodiment as shown in FIG. 8 may also be applied to the fifth embodiment of the present invention. The aforementioned slide valve 12 and the valve core 12A may be assembled with the check valve 43 and be further adapted as a combined valve F. Besides preserving functions of the first slide valve 12, the combined valve F is also equipped with a function of the check valve 43 that may refill the first signal chamber 1 with oil rapidly. A check-valve rod of the combined valve F may be chosen from the first check-valve rod 21A, the second check-valve rod 21B, the third check-valve rod 21C, and the fourth check-valve rod 21D, which is the same as the first embodiment.

With reference to FIGS. 1 to 26, a cylinder Z has a cylinder body 2, a piston rod 4, a piston 6, a top end B, and a bottom end A. The piston 6 and the piston rod 4 are connected as a piston assembly sliding in the cylinder body 2, and the piston 6 divides the space inside the cylinder body 2 into a first half 3 of the chamber and a second half 8 of the chamber. The cylinder Z may be connected with any of the abovementioned hydraulic buffers via oil lines. The buffering module Y of the hydraulic buffer is formed integrally on or assembled to the cylinder Z. The signal generators X are disposed in the two halves 3, 8 of the chamber of the cylinder Z, are able to control slide valves of the buffering module Y with oil at an end of a stroke, and further adjust hydraulic pressure in a pressure chamber or a return chamber of the cylinder Z. By at least one of the methods of pressure-relief unloading of the pressure chamber and the throttling backpressure of the return chamber, the signal generators X are able to control the velocity of the piston 6 and generate a buffering effect to the cylinder Z. Detailed mechanism has been described in the foregoing paragraphs.

Besides, the buffering module Y of the hydraulic buffer is formed integrally on or assembled to the top end B or the bottom end A. The axes of the holes of the buffering module Y are disposed perpendicularly or in parallel on the same plane with an axis of the cylinder Z. For the buffering module Y having two sets of holes, the axes are arranged in parallel, and the major holes and the minor holes of the two sets of the holes are disposed in perpendicular directions. As a result, the major oil groove of one of the two major holes aligns with the minor oil groove of the other one of the two major holes, and perpendicular to the axes of the holes.

Moreover, the buffering module Y of the hydraulic buffer is formed integrally on or assembled to the top end B or the bottom end A. The axes of the holes of the buffering module Y are arranged in a parallel direction, and are perpendicular to the axis of the cylinder Z on the same plane.

Furthermore, the two slide valves of the buffering module Y may be formed integrally on or assembled to the top end B and the bottom end A respectively via oil lines. The two axes of the two slide valves are perpendicular or parallel to the axis of the cylinder Z, and are located on the same plane.

Additionally, the two slide valves of the buffering module Y may be separated into two portions, and each one of the two portions has a respective one of the two slide valves and is formed integrally on or assembled to the top end B or the bottom end of the cylinder Z via oil lines. The two axes of the two slide valves are perpendicular or parallel to the axis of the cylinder Z, and are located on the same plane.

The aforementioned descriptions are based on the cylinder Z with only one piston rod. If the cylinder Z is equipped with two piston rods, a chamber inside the cylinder Z is similar to the first half 3 of the chamber. Also, the mechanism is the same as the cylinder Z with only one piston rod, so detailed description thereof will not be repeated.

With reference to FIGS. 1 to 26, more embodiments depending on practical requirements may be easily modified from the five embodiments of the present invention.

What is claimed is:

1. A hydraulic system comprising:
   a cylinder having
      a cylinder body having a top end, a bottom end, and a chamber inside the cylinder body;
      a piston assembly slidably moveable in the cylinder body, and having a piston rod and a piston mounted with the piston rod; and
   a hydraulic buffer connected with the cylinder and comprising:
      at least one signal generator disposed in the chamber of the cylinder and having
         a signal chamber disposed on the top end or the bottom end of the cylinder; and
         a signal plug being slidable relative to the signal chamber and located on a side of the piston; and a buffering module connected to the cylinder and having
   at least one slide valve connected to the at least one signal generator, controlled by the at least one signal generator to adjust hydraulic flows passing into and out of the chamber of the cylinder, and having a damping hole disposed therethrough; and
   at least one elastic component disposed in the buffering module and abutting the at least one slide valve;
wherein the signal plug moving with the piston assembly selectively enters and slides in the signal chamber and makes the signal chamber independent from the chamber of the cylinder when the signal plug enters the chamber, oil may be thereby sent from the signal chamber with part of the oil flowing through the damping hole and the rest of the oil that is sent from the signal chamber pushing the at least one slide valve to move against the at least one elastic component, and by this process, the hydraulic flows passing into and out of the cylinder may be adjusted and buffered by at least one of methods of pressure-relief unloading and throttling backpressure.

2. The hydraulic system as claimed in claim 1, wherein the hydraulic buffer further has at least one check valve or at least one combined valve, which is equipped with functions of the at least one check valve, so the signal chamber may be refilled with oil through the at least one check valve or the at least one combined valve.

3. The hydraulic system as claimed in claim 1, wherein
the piston divides the chamber into a first half of the chamber and a second half of the chamber; and
the at least one signal generator is disposed in the first half of the chamber or the second half of the chamber, and the at least one signal generator is able to control movements of the at least one slide valve of the buffering module.

4. The hydraulic system as claimed in claim 3, wherein the buffering module has two said slide valves, and the two slide valves are respectively connected to the bottom end or the top end of the cylinder.

5. The hydraulic system as claimed in claim 3, wherein the signal plug is integrally formed on the piston assembly, or is manufactured from a wear-resistant or elastic material and mounted to the piston assembly.

6. The hydraulic system as claimed in claim 4, wherein the signal plug is integrally formed on the piston assembly, or is manufactured from a wear-resistant or elastic material and mounted to the piston assembly.

7. The hydraulic system as claimed in claim 2, wherein
the piston divides the chamber into a first half of the chamber and a second half of the chamber;
the at least one signal generator is disposed in the first half of the chamber or the second half of the chamber, and the at least one signal generator is able to control movements of the at least one slide valve of the buffering module.

8. The hydraulic system as claimed in claim 7, wherein the buffering module has two said slide valves, and the two slide valves are respectively connected to the bottom end or the top end of the cylinder.

9. The hydraulic system as claimed in claim 7, wherein the signal plug is integrally formed on the piston assembly, or is manufactured from a wear-resistant or elastic material and mounted to the piston assembly.

10. The hydraulic system as claimed in claim 8, wherein the signal plug is integrally formed on the piston assembly, or is manufactured from a wear-resistant or elastic material and mounted to the piston assembly.

\* \* \* \* \*